(12) United States Patent
Flagg

(10) Patent No.: US 7,698,158 B1
(45) Date of Patent: Apr. 13, 2010

(54) LIFE INSURANCE POLICY EVALUATION METHOD

(75) Inventor: Barry D. Flagg, Tampa, FL (US)

(73) Assignee: TheInsuranceAdvisor Technologies, Inc., Tampa, FL (US)

( * ) Notice: Subject to any disclaimer, the term of this patent is extended or adjusted under 35 U.S.C. 154(b) by 1739 days.

(21) Appl. No.: 10/163,293

(22) Filed: Jun. 5, 2002

Related U.S. Application Data

(63) Continuation-in-part of application No. 09/694,899, filed on Oct. 24, 2000, now Pat. No. 6,456,979.

(51) Int. Cl.
*G06Q 40/00* (2006.01)
(52) U.S. Cl. .......................................... 705/4; 705/36 R
(58) Field of Classification Search .................... 705/4, 705/35
See application file for complete search history.

(56) References Cited

U.S. PATENT DOCUMENTS

| | | | |
|---|---|---|---|
| 4,837,693 A | 6/1989 | Schotz | |
| 5,523,942 A | 6/1996 | Tyler et al. | |
| 5,655,085 A | 8/1997 | Ryan et al. | |
| 5,926,792 A * | 7/1999 | Koppes et al. | 705/4 |
| 5,956,691 A * | 9/1999 | Powers | 705/4 |
| 6,009,402 A * | 12/1999 | Whitworth | 705/4 |
| 6,304,859 B1 * | 10/2001 | Ryan et al. | 705/38 |
| 2002/0040307 A1 * | 4/2002 | Roscoe et al. | 705/4 |

FOREIGN PATENT DOCUMENTS

| | | |
|---|---|---|
| JP | 359017656 A | 1/1984 |
| JP | 02001088468 A | 4/2001 |

OTHER PUBLICATIONS

Keating, Peter, "Your Money or Your Life (insurance)," Apr. 1999, Money, vol. 28, No. 4, pp. 156-160.*
P. Booth et al., Modern Actuarial Theory and Practice, pp. 306-351, Chapman & Hall/CRC.
Kenneth Black, Jr. and Harold D. Skipper, Jr., Life Insurance, Twelfth Edition, Chapter 10, pp. 238-241.
Kenneth Black, Jr. and Harold D. Skipper, Jr., Life & Health Insurance, Thirteenth Edition, pp. 279-295.
Randy Barkacs, Cost Disclosure Versus Concept Disclosure: A Personal Perspective, Journal of the American Society of CLU & ChFC, May 1996, pp. 62-66.
Joseph W. Maczuga, Crossover with Low Loads, www.Financial-Planning.com, Financial Planning, May 2001.

* cited by examiner

*Primary Examiner*—C. Luke Gilligan
*Assistant Examiner*—Rachel L Porter
(74) *Attorney, Agent, or Firm*—Courtney M. Dunn; Smith & Hopen P.A.

(57) ABSTRACT

A method of evaluating a permanent life insurance policy including the steps of accessing a policy illustration, establishing an effective life span of the policy illustration, identifying a first amount attributed to death benefit claims, identifying a second amount attributed to premium loads, identifying a third amount attributed to policy expenses, calculating a sum of the first, second and third amounts for a plurality of policy years, averaging the sum for each year throughout the effective life span, calculating a cash value of the policy illustration for the plurality of policy years, identifying a projected investment earnings forecast in the policy illustration, normalizing the projected investment earnings forecast, adding the project investment earnings to the cash value, and recalculating the current cash value of the policy illustration for the plurality of policy years.

14 Claims, 16 Drawing Sheets

All three policies have substantially similar Sums.

Fig. 12

Cost of Insurance (COI) Analysis Table
%* = Percent of industry standard table shown in Column (1)

| (1) | | (2) | | (3) | | (4) | | (5) | | (6) | | (7) | |
|---|---|---|---|---|---|---|---|---|---|---|---|---|---|
| Policy Yr & Age (BoY) | | 75-80 S&U Male Age Nearest Rate | | Gender Adj'd Benchmark | | Nonsmoker Tobacco Use Adj'd Benchmark | | Health/Lifestyle Profile Adj'd Benchmark | | Pricing-Method Adjustments | | | |
| | | | | | | | | | | Retail Benchmark | | Institutional Benchmark | |
| | | | | %* | Rate | %* | Rate | %* | Rate | %* | Rate | %* | Rate |
| 1 | 50 | 0.00170 | | #N/A | 0.00170 | 62.6% | 0.00106 | 100.0% | 0.00106 | 76.0% | 0.00081 | 64.0% | 0.00068 |
| 2 | 51 | 0.00242 | | #N/A | 0.00242 | 62.6% | 0.00151 | 100.0% | 0.00151 | 76.0% | 0.00115 | 64.0% | 0.00097 |
| 3 | 52 | 0.00304 | | #N/A | 0.00304 | 62.6% | 0.00190 | 100.0% | 0.00190 | 76.0% | 0.00145 | 64.0% | 0.00122 |
| 49 | 98 | 0.30565 | | #N/A | 0.30565 | 62.6% | 0.19134 | 100.0% | 0.19134 | 76.0% | 0.14542 | 64.0% | 0.12246 |
| 50 | 99 | 0.32292 | | #N/A | 0.32292 | 62.6% | 0.20215 | 100.0% | 0.20215 | 76.0% | 0.15363 | 64.0% | 0.12937 |
| 51 | 100 | 0.34061 | | #N/A | 0.34061 | 62.6% | 0.21322 | 100.0% | 0.21322 | 76.0% | 0.16205 | 64.0% | 0.13646 |

Fig. 13

Cost of Insurance (COI) Analysis Table
%* = Percent of industry standard table shown in Column (1)

| (1) | | (2) | (3) | | (4) | | (5) | | (6) | | (7) | |
|---|---|---|---|---|---|---|---|---|---|---|---|---|
| Policy Yr & Age (BoY) | | 75-80 S&U Male Age Nearest Rate | Gender Adj'd Benchmark | | Nonsmoker Tobacco Use Adj'd Benchmark | | Health/Lifestyle Profile Adj'd Benchmark | | Pricing-Method Adjustments | | | |
| | | | | | | | | | Retail Benchmark | | Institutional Benchmark | |
| | | | %* | Rate | %* | Rate | %* | Rate | %* | Rate | %* | Rate |
| 1 | 50 | 0.00170 | #N/A | 0.00170 | 62.6% | 0.00106 | 100.0% | 0.00106 | 76.0% | 0.00081 | 64.0% | 0.00068 |
| 2 | 51 | 0.00242 | #N/A | 0.00242 | 62.6% | 0.00151 | 100.0% | 0.00151 | 76.0% | 0.00115 | 64.0% | 0.00097 |
| 3 | 52 | 0.00304 | #N/A | 0.00304 | 62.6% | 0.00190 | 100.0% | 0.00190 | 76.0% | 0.00145 | 64.0% | 0.00122 |
| 49 | 98 | 0.30565 | #N/A | 0.30565 | 62.6% | 0.19134 | 100.0% | 0.19134 | 76.0% | 0.14542 | 64.0% | 0.12246 |
| 50 | 99 | 0.32292 | #N/A | 0.32292 | 62.6% | 0.20215 | 100.0% | 0.20215 | 76.0% | 0.15363 | 64.0% | 0.12937 |
| 51 | 100 | 0.34061 | #N/A | 0.34061 | 62.6% | 0.21322 | 100.0% | 0.21322 | 76.0% | 0.16205 | 64.0% | 0.13646 |

Fig. 14

| Cost of Insurance (COI) Analysis Table | | | | | | | | | | | | |
|---|---|---|---|---|---|---|---|---|---|---|---|---|
| %* = Percent of industry standard table shown in Column (1) | | | | | | | | | | | | |
| (1) | | (2) | (3) | | (4) | | (5) | | (6) | | (7) | |
| Policy Yr & Age (BoY) | | 75-80 S&U Male Age Nearest Rate | Gender Adj'd Benchmark | | Nonsmoker Tobacco Use Adj'd Benchmark | | Health/Lifestyle Profile Adj'd Benchmark | | Pricing-Method Adjustments | | | |
| | | | | | | | | | Retail Benchmark | | Institutional Benchmark | |
| | | | %* | Rate | %* | Rate | %* | Rate | %* | Rate | %* | Rate |
| 1 | 50 | 0.00170 | #N/A | 0.00170 | 62.6% | 0.00106 | 100.0% | 0.00106 | 76.0% | 0.00081 | 64.0% | 0.00068 |
| 2 | 51 | 0.00242 | #N/A | 0.00242 | 62.6% | 0.00151 | 100.0% | 0.00151 | 76.0% | 0.00115 | 64.0% | 0.00097 |
| 3 | 52 | 0.00304 | #N/A | 0.00304 | 62.6% | 0.00190 | 100.0% | 0.00190 | 76.0% | 0.00145 | 64.0% | 0.00122 |
| ↓ | | ↓ | | ↓ | ↓ | | ↓ | | ↓ | | ↓ | |
| 49 | 98 | 0.30565 | #N/A | 0.30565 | 62.6% | 0.19134 | 100.0% | 0.19134 | 76.0% | 0.14542 | 64.0% | 0.12246 |
| 50 | 99 | 0.32292 | #N/A | 0.32292 | 62.6% | 0.20215 | 100.0% | 0.20215 | 76.0% | 0.15363 | 64.0% | 0.12937 |
| 51 | 100 | 0.34061 | #N/A | 0.34061 | 62.6% | 0.21322 | 100.0% | 0.21322 | 76.0% | 0.16205 | 64.0% | 0.13646 |

Fig. 15

| Cost of Insurance (COI) Analysis Table | | | | | | | | | | | | |
|---|---|---|---|---|---|---|---|---|---|---|---|---|
| %* = Percent of industry standard table shown in Column (1) | | | | | | | | | | | | |
| (1) | | (2) | (3) | | (4) | | (5) | | (6) | | (7) | |
| Policy Yr & Age (BoY) | | 75-80 S&U Male Age Nearest Rate | Gender Adj'd Benchmark | | Nonsmoker Tobacco Use Adj'd Benchmark | | Health/Lifestyle Profile Adj'd Benchmark | | Pricing-Method Adjustments | | | |
| | | | | | | | | | Retail Benchmark | | Institutional Benchmark | |
| | | | %* | Rate | %* | Rate | %* | Rate | %* | Rate | %* | Rate |
| 1 | 50 | 0.00170 | #N/A | 0.00170 | 62.6% | 0.00106 | 100.0% | 0.00106 | 76.0% | 0.00081 | 64.0% | 0.00068 |
| 2 | 51 | 0.00242 | #N/A | 0.00242 | 62.6% | 0.00151 | 100.0% | 0.00151 | 76.0% | 0.00115 | 64.0% | 0.00097 |
| 3 | 52 | 0.00304 | #N/A | 0.00304 | 62.6% | 0.00190 | 100.0% | 0.00190 | 76.0% | 0.00145 | 64.0% | 0.00122 |
| ↓ | | ↓ | | ↓ | ↓ | | ↓ | | ↓ | | ↓ | |
| 49 | 98 | 0.30565 | #N/A | 0.30565 | 62.6% | 0.19134 | 100.0% | 0.19134 | 76.0% | 0.14542 | 64.0% | 0.12246 |
| 50 | 99 | 0.32292 | #N/A | 0.32292 | 62.6% | 0.20215 | 100.0% | 0.20215 | 76.0% | 0.15363 | 64.0% | 0.12937 |
| 51 | 100 | 0.34061 | #N/A | 0.34061 | 62.6% | 0.21322 | 100.0% | 0.21322 | 76.0% | 0.16205 | 64.0% | 0.13646 |

Fig. 16

Cost of Insurance (COI) Analysis Table
%* = Percent of industry standard table shown in Column (1)

| (1) | | (2) | (3) | | (4) | | (5) | | (6) | | (7) | |
|---|---|---|---|---|---|---|---|---|---|---|---|---|
| | | 75-80 S&U | Gender Adj'd | | Nonsmoker | | Health/Lifestyle | | Pricing-Method Adjustments | | | |
| | | Male Age | | | Tobacco Use | | Profile Adj'd | | Retail | | Institutional | |
| Policy Yr & | | Nearest | Benchmark | | Adj'd Benchmark | | Benchmark | | Benchmark | | Benchmark | |
| Age (BoY) | | Rate | %* | Rate | %* | Rate | %* | Rate | %* | Rate | %* | Rate |
| 1 | 50 | 0.00170 | #N/A | 0.00170 | 62.6% | 0.00106 | 100.0% | 0.00106 | 76.0% | 0.00081 | 64.0% | 0.00068 |
| 2 | 51 | 0.00242 | #N/A | 0.00242 | 62.6% | 0.00151 | 100.0% | 0.00151 | 76.0% | 0.00115 | 64.0% | 0.00097 |
| 3 | 52 | 0.00304 | #N/A | 0.00304 | 62.6% | 0.00190 | 100.0% | 0.00190 | 76.0% | 0.00145 | 64.0% | 0.00122 |
| ⋮ | | ▼ | | ▼ | | ▼ | | ▼ | | ▼ | | ▼ |
| 49 | 98 | 0.30565 | #N/A | 0.30565 | 62.6% | 0.19134 | 100.0% | 0.19134 | 76.0% | 0.14542 | 64.0% | 0.12246 |
| 50 | 99 | 0.32292 | #N/A | 0.32292 | 62.6% | 0.20215 | 100.0% | 0.20215 | 76.0% | 0.15363 | 64.0% | 0.12937 |
| 51 | 100 | 0.34061 | #N/A | 0.34061 | 62.6% | 0.21322 | 100.0% | 0.21322 | 76.0% | 0.16205 | 64.0% | 0.13646 |

Fig. 17

Cost of Insurance (COI) Analysis Table
%* = Percent of industry standard table shown in Column (1)

| (1) | | (2) | (3) | | (4) | | (5) | | (6) | | (7) | |
|---|---|---|---|---|---|---|---|---|---|---|---|---|
| | | 75-80 S&U | Gender Adj'd | | Nonsmoker | | Health/Lifestyle | | Pricing-Method Adjustments | | | |
| | | Male Age | | | Tobacco Use | | Profile Adj'd | | Retail | | Institutional | |
| Policy Yr & | | Nearest | Benchmark | | Adj'd Benchmark | | Benchmark | | Benchmark | | Benchmark | |
| Age (BoY) | | Rate | %* | Rate | %* | Rate | %* | Rate | %* | Rate | %* | Rate |
| 1 | 50 | 0.00170 | #N/A | 0.00170 | 62.6% | 0.00106 | 100.0% | 0.00106 | 76.0% | 0.00081 | 64.0% | 0.00068 |
| 2 | 51 | 0.00242 | #N/A | 0.00242 | 62.6% | 0.00151 | 100.0% | 0.00151 | 76.0% | 0.00115 | 64.0% | 0.00097 |
| 3 | 52 | 0.00304 | #N/A | 0.00304 | 62.6% | 0.00190 | 100.0% | 0.00190 | 76.0% | 0.00145 | 64.0% | 0.00122 |
| ⋮ | | ▼ | | ▼ | | ▼ | | ▼ | | ▼ | | ▼ |
| 49 | 98 | 0.30565 | #N/A | 0.30565 | 62.6% | 0.19134 | 100.0% | 0.19134 | 76.0% | 0.14542 | 64.0% | 0.12246 |
| 50 | 99 | 0.32292 | #N/A | 0.32292 | 62.6% | 0.20215 | 100.0% | 0.20215 | 76.0% | 0.15363 | 64.0% | 0.12937 |
| 51 | 100 | 0.34061 | #N/A | 0.34061 | 62.6% | 0.21322 | 100.0% | 0.21322 | 76.0% | 0.16205 | 64.0% | 0.13646 |

Fig. 18

| Policy Name: | | Sample VUL (Experience-Rated) | | | |
|---|---|---|---|---|---|
| Abbreviated Name: | | Sample VUL | | | |
| Policy Type: | | VUL | (VUL, UL or WL) | | |
| Insured/Applicant Sex (M/F): | | M | (M or F) | | |
| Insured/Applicant Age/Age Group: | | 50 | | | |
| Insured/Applicant Health Profile: | | Preferred | (Standard, Preferred, or Preferred+) | | |
| Smoker Status: | | NS | (NS or SM) | | |
| Face Amount: | | 1,000,000 | | | |
| Death Benefit Option | | Level | | | |
| Endowment/Maturity Age: | | 100 | | | |
| Pricing Category: | | Institutional | | | |
|    Retail | | | | | |
|    Institutional | | | | | |
|    Experience-Rated | | | | | |
| Funding Intent: | | Min Fund | | | |
|    Max Fund | | | | | |
|    Single Pay | | | | | |
|    Min Fund | | | | | |
| Planned Annual Premium (for CV Comparison) | | $ 10,000 | | | |
| Target Premium (for Surrender Charge calc) | | $ 10,000 | | | |
| Surrender Charge Duration | | 10 | Yrs | | |
| Target Funding Period | | 10 | | | |
| Target Net Average Policy Earnings Rate: | | 10.00% | | | |

Fig. 19

| Age | Policy Year 6 | 7 | 8 | 9 | 10 |
|---|---|---|---|---|---|
| 47 | 0.00285 | 0.00320 | 0.00387 | 0.00453 | 0.00513 |
| 48 | 0.00286 | 0.00348 | 0.00423 | 0.00495 | 0.00562 |
| 49 | 0.00310 | 0.00379 | 0.00460 | 0.00540 | 0.00601 |
| 50 | 0.00337 | 0.00410 | 0.00498 | 0.00573 | 0.00645 |
| 51 | 0.00364 | 0.00443 | 0.00526 | 0.00612 | 0.00700 |
| 52 | 0.00392 | 0.00465 | 0.00557 | 0.00659 | 0.00769 |
| 53 | 0.00424 | 0.00510 | 0 | 0.00736 | 0.00862 |

1) Locate the row corresponding to the original policy issue age 50 in the left-most age column.

2) locate the column corresponding to the 8th year of the policy along the top row/heading of the table 3) look up the rate at the intersection of the Age 50 row and the 8th Year column.

Fig. 20

| Age | Policy Year 23 | 24 | 25 | Ultimate Rate | Age |
|---|---|---|---|---|---|
| 47 | 0.02016 | 0.02199 | 0.02404 | 0.03063 | 72 |
| 48 | 0.02174 | 0.02362 | 0.02619 | 0.03357 | 73 |
| 49 | 0.02320 | 0.02573 | 0.02853 | 0.03681 | 74 |
| 50 | 0.02527 | 0.02803 | 0.03110 | 0.04015 | 75 |
| 51 | 0.02753 | 0.03055 | 0.03352 | 0.04409 | 76 |
| 52 | 0.02981 | 0.03292 | 0.03836 | 0.04883 | 77 |
| 53 | 0.03232 | 0.03792 | 0.04394 | 0.05407 | 78 |
| 54 | 0.03704 | 0.04321 | 0.05029 | 0.05995 | 79 |
| 55 | 0.04248 | 0.04921 | 0.05635 | 0.06619 | 80 |
| 56 | 0.04866 | 0.05515 | 0.06355 | | 81 |
| 57 | 0.05455 | 0.06222 | 0.07138 | | 82 |

1) Locate the row corresponding to the original policy issue age 50 in the left-most age column 2) Follow the original issue age 50 row to the far right column labeled "Ultimate Rate", then follow that column down to the intersection of that column, to the age 80 row

Fig. 21

Smoker-Nonsmoker 1990-95 Experience by Issue Age
Separately for Medical, Paramedical and Nonmedical; Males and Females
Cmbined Issues of 1980-94 Studied Between 1990 and 1995 Anniversaries
Expected Deaths Based on 1975-80 Basic Tables (Exposures in $1,000,000 Units;
Actual Deaths in $1,000 Units)

| (1) | (2) | (3) | (4) | (5) | (6) | (7) | (8) |
|---|---|---|---|---|---|---|---|
| Age at Issue | Exposure | Actual Deaths | Mortality Ratio | Exposure | Actual Deaths | Mortality Ratio | Ratio of Smoker-Nonsmoker Mortality Ratios |
| 0—19 | $208,763 | $71,835 | 72.7 | $8,232 | $4,332 | 81.0 | 1.11 |
| 20-29 | $651,272 | $284,100 | 66.4 | $88,682 | $76,261 | 128.8 | 1.94 |
| 30-39 | $1,379,160 | $777,645 | 50.1 | $198,505 | $269,406 | 117.3 | 2.34 |
| 40-49 | $754,661 | $988,283 | 55.2 | $127,523 | $377,036 | 120.1 | 2.17 |
| 50-59 | $258,461 | $868,216 | 62.6 | $44,419 | $379,014 | 153.4 | 2.45 |
| 60 & over | $99,069 | $924,048 | 78.8 | $13,969 | $291,313 | 181.7 | 2.31 |
| Total | $3,351,388 | $3,914,130 | 60.9 | $481,333 | $1,397,365 | 137.6 | 2.26 |

LIFE INSURANCE POLICY EVALUATION METHOD

RELATED APPLICATIONS

This application is a Continuation-in-Part and claims priority to U.S. patent application Ser. No. 09/694,899 filed Oct. 24, 2000 now U.S. Pat. No. 6,456,979 incorporated herein by reference.

FIELD OF INVENTION

This invention relates to a method for evaluating financial information, and more specifically to evaluating permanent life insurance policies for cost and performance criteria.

BACKGROUND OF THE INVENTION

While permanent life insurance products that differ by virtue of their makeup are distinguished from one another by industry accepted naming conventions, the insurance industry does not formally label the different pricing methodologies of the different types of products priced and targeted for different types of consumers. For instance, there are only 3 basic types of permanent life insurance when grouped by virtue of their makeup: (1) whole life insurance which typically provides level death benefit coverage for the whole of the insured's life; (2) universal life insurance policies which are flexible-premium, adjustable death benefit, unbundled life contracts; and (3) variable universal life whose values may vary directly with the performance of a set of earmarked investments. *Life & Health Insurance:* 13*th Edition*. Black, Kenneth, Jr., Skipper, Harold D., Jr. Prentice Hall (2000). It should be noted that variable life is an early evolution of the category of variable life insurance policies.

While no such similar formal naming convention exists to distinguished products that differ by virtue of the market for which they are priced and to which they are marketed, all policies can, nonetheless, be categorized by the nature of the underlying expenses as to COIs, Premium-Based Charges, Cash-Value-Based Charges, and Fixed-Type Charges, and the manner in which these expenses are assembled into the following 3 basic groups based on the following 3 different markets/pricing methodologies:

1) Retail Products/Pricing
2) Institutional Products/Pricing
3) Experience-Rated Products/Pricing Retail Products/Pricing The life insurance needs of the general consumer are still largely served by the existing distribution system of Agents and Brokers (herein collectively "Agents") who represent a particular insurance company or group of companies. This method of distribution typically involves the "bundling" the sale of the life insurance product together with some level of value-added financial planning service related directly or indirectly to the need for life insurance (e.g. like determining the amount of life insurance needed though a capital needs analysis, general retirement planning, overall benefit planning and consulting, income tax planning, business continuity consulting and financing, general estate planning, estate tax financing, etc.). There is often a high-level of personal involvement associated with the marketing and sale of a particular insurance company's products by the traditional Agent. Because of this high-level of personal involvement leading up to the purchase of life insurance, and absent any easy and convenient means of doing some level of "comparison shopping", there is considerable disincentive for consumers to separate the purchase of life insurance from these value added services.

In the current distribution environment where Agents represent only a small fraction of the total number of insurance carriers whose products could otherwise prove suitable, and without any effective means for Agents to compare product pricing on behalf of the consumer, separating the insurance purchase from the value added services would require the consumer to 1) engage and pay a fee-for-service Advisor to repeat the planning already prepared by the Agent, 2) contact multiple other Agents for "price quotes" (i.e. hypothetical policy illustrations), and 3) either attempt to compare the hypothetical policy illustrations involving literally thousands of computations (as described above/below), or engage and pay a another fee-for-service Advisor to do the "comparison shopping" for them. As a result, because of this high-level of personal Agent involvement, and additional and redundant time, energy, difficulty and cost preventing consumers from doing some level of comparison shopping, these products typically have high(er) loads or high(er) surrender charges. As such, by analogy with other products marketed to the general consumer that also typically have higher costs associated with the distribution of the product, these products will be referred to as "Retail" products.

In addition to the "Retail" products marketed and sold by the existing traditional distribution systems of Agents, there are other forms of "Retail" products marketed directly to the general consumer through alternative distribution channels like the Internet, television, direct mail, or through a variety of associations to which the consumer may be a member. These products are customarily marketed on the basis of offering lower or no loads, or lower or no surrender charges, and for these reasons, implies the promise of superior value to the consumer. For instance, a characteristic representation of one of these "Low-Load Direct-Retail" products is that they "dramatically reduce product charges and eliminate front-end and back-end sales loads . . . " and that these products are "designed from the investor's perspective and now offers a life insurance plan that provides a good vehicle to accumulate and transfer wealth." Of course, the implication is that by reducing or eliminating certain policy loads, these "No/Low-Load" products offer an inherently superior value, and have been developed in direct response to the absence of any means for either the direct consumer or the Agents to easily and simply compare insurance product pricing. In the absence of complete product pricing information that is vital to making an informed insurance decision, consumers are unable to seek out, identify and purchase the most efficiently priced product, and in so doing, create pressure in the market to squeeze out the inefficiently-priced products. As such, the market of certain insurance product manufacturers has responded by reducing or eliminating those policy costs that are most visible to the general consumer.

However, as previously mentioned, the most influential policy pricing component are typically the COIs, which have as much as 5-Times the impact over policy pricing than do the visible, disclosed policy loads and expenses. From the perspective of the insurance company, insurance is simply the transfer of risk of financial loss from an individual where that risk is unpredictable, to a group of individuals that is sufficiently large to make that risk both predictable and fundable. COIs are the mechanism by which life insurers typically "fund" the payment of these death claims. As such, insurance companies pool policies to make these risks more predictable, and the larger the pool, the more predictable the risk. This pooling, which has the effect of combining large and small policies, and low and high risk segments of the pool, averages the variables that contribute to premium prices. Since different groups of policyholders have different claims experience and expenses profiles, premiums will vary depending on the claims experience and expenses for the group being insured. In effect, this averaging cross-subsidizes smaller transactions and higher-risk segments with excess "profits" from the larger transactions and lower-risk segments in the pool.

In addition, as previously mentioned, certain insurers "load" the COIs to cover other policy expenses that are not disclosed elsewhere. For instance, some policies marketed as "no/low-load" policies do not disclose certain policy expenses or loads, even though they must be paid (e.g. State Premium Taxes, Federal Deferred Acquisition Costs (DAC) Taxes, and the cost to distribute the policies [policies do not distribute themselves]). As such, some of these "No/Low Load" products include the same, or in some cases, higher "loads" to cover the costs of distributing the policy directly to the consumer rather than through an Agent, but these loads are not disclosed, but instead are often "hidden" inside the unpublished "loaded" COI charges. Consequently, because these "No/Low Load" products are marketed to the general consumer and also typically have higher costs associated with the distribution of the product, these products will also be referred to as "Retail" products, which will be collectively defined as those policies that 1) are available to the general consumer as evidenced by no or low minimum insurance face amount or premium requirements, 2) have higher policy expenses relative to the benchmarks established below without regard to whether these policy expenses take the form of loads, COIs or other policy charges.

Institutional Products/Pricing

Large companies and high-net-worth individuals purchase insurance differently than the average "retail" buyer. Because large transactions and large groups of policies can cost less to sell and administer, carriers frequently reduce institutional policy costs to reflect volume discounts and economies of scale. Because Institutional products are maintained longer, are more well-funded, and are larger, they can be placed and administered more efficiently and have can have lower expense ratios than products for Retail markets. Somewhat paradoxically, however, because some institutional products are designed specifically to be used in certain administratively-intense corporate benefits plans, these type of institutionally-priced products can actually include higher levels of certain policy loads and expenses. In either case, a distinguishing characteristic of institutionally-priced products is that they assess lower or no charges for early surrender/cancellation. While institutional products are becoming more widely available, threshold financial requirements still limit access to Institutional Pricing that offers lower premiums to only a small percent of insurance buyers. Institutional products will be collectively defined as those policies that 1) only available to the qualified buyers as determined by either some minimum insurance face amount or premium requirements, or by virtue of certain personal or corporate financial suitability requirements, and 2) have lower policy expenses relative to the benchmarks established below without regard to whether these policy expenses take the form of loads, COIs or other policy charges.

Experience-Rated Pricing

In addition to the same advantage of lower expenses offered by Institutional Pricing, Experience-Rated Pricing also offers the benefit of lower COI charges. Experience-Rated products are either proprietary products of private placement products available to only a selective and segregated pool of qualified companies and qualified individuals. Experience-Rated products are priced for the superior claims experience of professionals, business executives and owners, and high net worth individuals. Because this group enjoys healthier lifestyles and better health care, they live longer, and therefore, experiences lower mortality rates. Products priced for this market generally have lower COI charges than products sold to retail and institutional markets, in similar form or fashion as to the way GEICO® auto insurance selects low-risk drivers for their pool, and then charges lower premiums corresponding to the superior claims experience of that pool. Experience-rated products will therefore be collectively defined as those policies that 1) are only available to the qualified buyers as determined by either some minimum insurance face amount or premium requirements, or by virtue of certain personal or corporate financial suitability requirements, or by virtue of some occupational or lifestyle suitability requirement and 2) have lower COIs relative to the benchmarks established below.

There is presently no technology for the comparison of permanent life insurance products. The only existing technology involves the comparison of "fixed premium/fixed benefit" products, like term life insurance, where a predetermined premium is stipulated for a given amount of coverage. In this application, this current technology involves the creation of a database of published information and then simply searching this database for this fixed rate based on the amount of coverage and a number of other factors like age, gender, risk profile, etc. However, due to the lack of published information about the pricing of permanent life insurance products, and due to the number of combinations and permutations of the number of variables involved in the pricing of an individual life insurance product, the current database-search-engine-like technology does not lend itself to the comparison of permanent life insurance products. For this reason, the consumer is currently relegated to, for lack of a superior method, seeking out this information on their own, but limited to the extent that they have a personal relationship with a sufficiently large number of life insurance Agents who are properly licensed to sell a given life insurance product or products as to be able to obtain the information on a wide enough variety of products to make an informed decision as to the most suitable product for the given client/need.

Accordingly, what is needed in the art is method for accurately comparing the value and performance of a permanent life insurance policy.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF THE INVENTION

The present invention comprises a method of benchmarking the efficiency of a permanent life insurance policy including the steps of accessing a policy illustration, selecting a value point of the policy, identifying an array of aggregate expenses assessed by the insurance carrier to maintain the policy, calculating a sum of the array, and presenting the sum relative to the value point of the policy. The value point may be the face amount value of the policy, cash value of the policy or fixed value of the policy by policy year. The array of aggregate expenses may include costs illustrated by the insurance carrier to pay out death benefit claims, policy charges less costs related to the payment of death claims exacted by the insurance carrier, premium loads exacted by the insurance carrier as a percentage of premiums paid, taxes paid to at least one governmental agency by the insurance carrier, cash-value-based expenses exacted by the insurance carrier as a percentage of policy cash values, or fixed expenses exacted by the insurance carrier in an amount calculated at the inception of the policy.

In a preferred embodiment of the invention, the expected mortality rate for the policy illustration is established based on industry published data and the illustrated costs to pay out death benefit claims are compared with the expected mortality rate whereby the competitiveness and reasonableness of the policy illustration's representations is determined. An expected policy expense charge value for the policy illustration may be established based on industry published data and the illustrated policy expense charges compared with expected policy expense charges whereby the competitiveness and reasonableness of the policy illustration's representations is determined. An expected premium load for the policy illustration may also be established based on industry published data and the illustrated premium loads compared with the expected premium loads whereby the competitiveness and reasonableness of the policy illustration's representations is determined. Similarly, an expected tax for the policy illustration based on industry published data may be resolved and the illustrated tax compared with the expected tax loads whereby the competitiveness and reasonableness of the policy illustration's representations is determined. An expected cash-value-based expense value for the policy illustration based on industry published data is established and the illustrated cash-value-based expense values compared with the expected cash-value-based expense values whereby determine the competitiveness and reasonableness of the policy illustration's representations is determined. An expected fixed expense value for the policy illustration based on industry published data may be established and the illustrated fixed expenses compared with the expected fixed expenses whereby determine the competitiveness and reasonableness of the policy illustration's representations is determined.

It is preferred that the step of normalizing the array of aggregate expenses is calculated in terms of present value and the array of expected aggregate expenses compared to the array of policy expenses assessed each year by the insurance carrier to maintain the policy. In addition, the timing and weighting of the array of expected aggregate expenses is compared to the timing and weighting of the array of policy expenses assessed by the insurance carrier to maintain the policy.

As opposed to term insurance, which is not the subject of the present invention, permanent life insurance is generally anticipated to insure an individual until death. Accordingly, the effective life span of a permanent life insurance policy is based upon standard mortality table and might be adjusted for specific lifestyle and health issues known about the insured. Accordingly, the steps may also include establishing an effective life span of the policy illustration, calculating the sum for a plurality of policy years, and averaging the sum for each year throughout the effective life span. This helps determine if a policy might be front-loaded with costs and expenses incurred early in the life span of the policy, or whether the costs and expenses are more evenly distributed over a longer period of time. As the cash value of a permanent life insurance policy is a strong financial consideration, a breakdown of costs by years is particularly important when determining the appropriateness of a policy that is completely funded early on, or one of which payments are made for an extended period. Therefore, an additional step may include calculating a cash value of the policy illustration for the plurality of policy years.

Permanent life insurance policies gain cash value by investment in mutual funds, stocks, bonds and other investment instruments. However, projections made about the investment income are difficult, if not impossible to validate since they rely on unknown assumptions about the future of the economy. Accordingly, a preferred embodiment of the invention includes the steps of identifying a projected investment earnings forecast in the policy illustration, normalizing the projected investment earnings forecast, adding the project investment earnings to the cash value, and recalculating the current cash value of the policy illustration for the plurality of policy years.

A direct comparison of a plurality of products may be achieved by selecting an array of additional permanent life insurance policies having substantially the same death benefit, and calculating the sum for each policy in the array. Additional steps may include averaging the sums of the array to create a benchmark value, and measuring new policy illustrations against the benchmark value.

Market segments generally include, but are not necessarily limited to, retail, institutional and experience-rated pricing. Accordingly, to compare products of the same category, additional steps include identifying a market segment for permanent insurance products, grouping an array of additional permanent life insurance policies having substantially the same death benefit and availability to the market segment, and calculating the sum for each policy in the array. Benchmarks values are obtained by averaging the sums of the array to create a benchmark value for the market segment, and measuring new policy illustrations against the benchmark value.

Benchmarking the efficiency of a permanent life insurance policy includes the steps of accessing a policy illustration, establishing an effective life span of the policy illustration, identifying a first amount attributed to death benefit claims, identifying a second amount attributed to premium loads, identifying a third amount attributed to policy expenses, calculating a sum of the first, second and third amounts for a plurality of policy years, averaging the sum for each year throughout the effective life span, calculating a cash value of the policy illustration for the plurality of policy years, identifying a projected investment earnings forecast in the policy illustration, normalizing the projected investment earnings forecast, adding the project investment earnings to the cash value, and recalculating the current cash value of the policy illustration for the plurality of policy years.

In many cases, it is difficult to obtain the true cost of insurance from a policy illustration. However, costs of insurance are based on mortality and, thus death benefit paid. Accordingly, a benchmark cost of insurance rate may be resolved by accessing a mortality table, evaluating an expected mortality value based on the mortality table, and calculating a benchmark cost of insurance based on the expected mortality value. Additional steps include establishing a policy duration, evaluating an expected mortality value based on each year of the policy duration, and calculating a benchmark cost of insurance based on the policy duration. For a more precise benchmark cost of insurance value, additional steps include identifying an array of mortality variables of a potential policy holder, and accessing a specific mortality table matching the array.

It is therefore an object of the present invention to provide a method to quantify the value of a permanent life insurance product against an industry benchmark.

It is another object of the present invention to provide a means to compare two competing permanent life insurance products.

It is another object of the present invention to provide a means to determine the cash value of a permanent life insurance policy throughout the effective span of the policy.

It is another object of the present invention to provide a means of resolving the true cost of insurance based on normalized investment earnings.

An advantage of the present invention is that permanent life insurance policies may be evaluated for value and efficiency regardless of how costs, expenses and anticipated investment income are presented to the customer.

Another advantage of the present invention is that permanent life insurance policies may be evaluated based on forecasted cash value to determine which polices are efficient enough, based on normalized investment income, to accumulate cash value through the life of the policy versus less desirable policies whose expenses and costs erode the cash value of the policy before the anticipated life span expires.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIGS. 12-17 are costs of insurance analysis tables.

FIG. 18 is an illustrative permanent life insurance illustration.

FIG. 19 is an illustrative mortality table focused on a 50 year old in the eighth policy year.

FIG. 20 is an illustrative mortality table focused on a 50 year old's ultimate rate at age 80.

FIG. 21 is an illustrative experience-rated mortality table.

DETAILED DESCRIPTION OF THE PREFERRED EMBODIMENT

Figure 1:
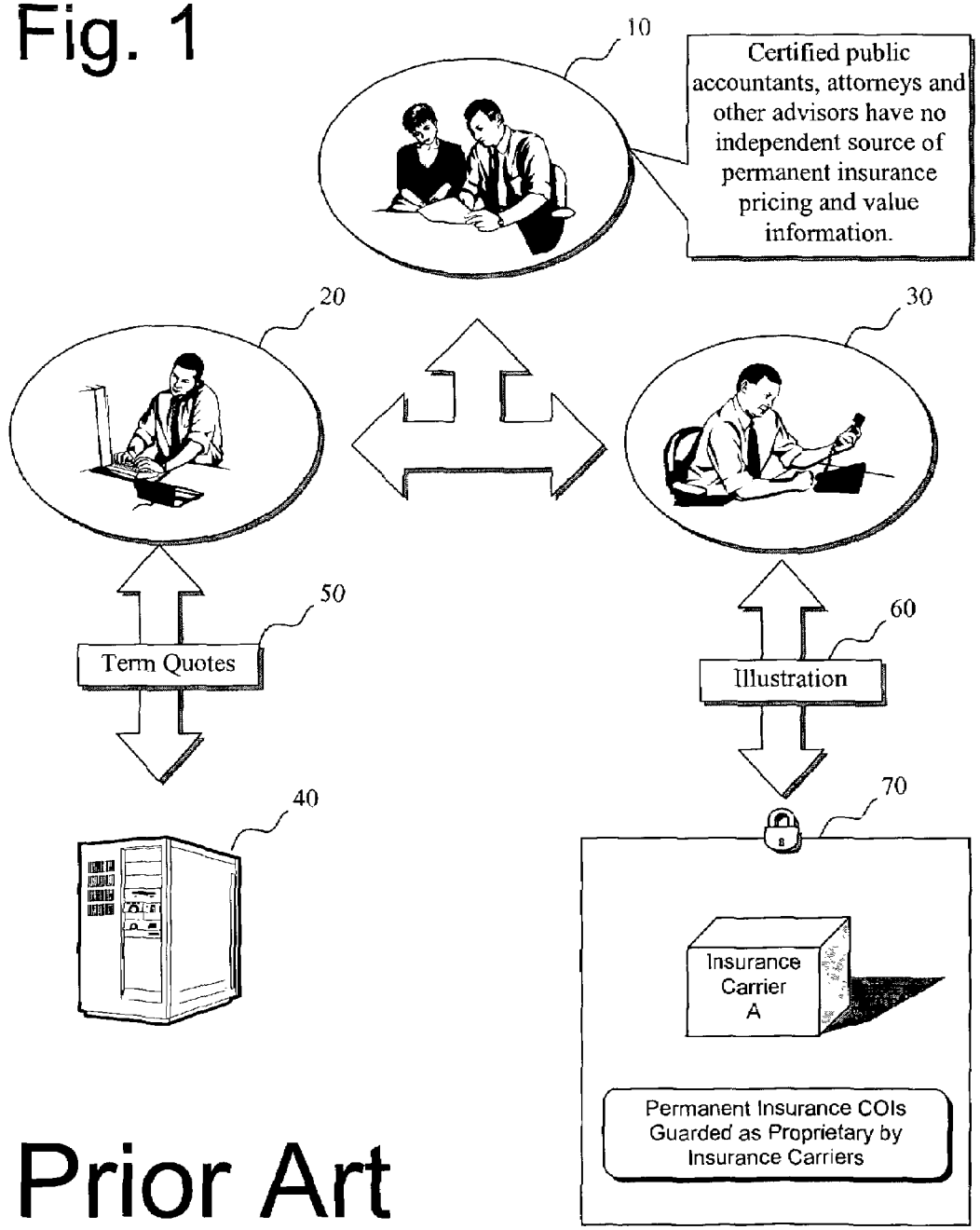
FIG. 1 is a diagrammatic view of the prior art without the application of the present novel invention.

Referring initially to FIG. 1, the prior art generally includes a consultation with an Advisor 10. The Advisor 10 may be a certified public accountant, an attorney or other form of trusted professional that clients seek assistant from in financial matters. If the client desires term insurance, the advisor may conduct an online session 20 with a data repository such as QuoteSmith® which posts term life insurance quotes 50 back to the Advisor. However, in the case of permanent life insurance policies, the Advisor must initiate contact 30 with an insurance carrier's representative 70 which then provides a policy illustration 60 back to the Advisor. However, such illustrations may be substantially misleading in representing their true costs and expenses. Accordingly, the Advisor typically analyzes superficial criteria such as the loads associated with the policy, unaware that "no-load" products may hide significant expenses in other areas.

Figure 2:
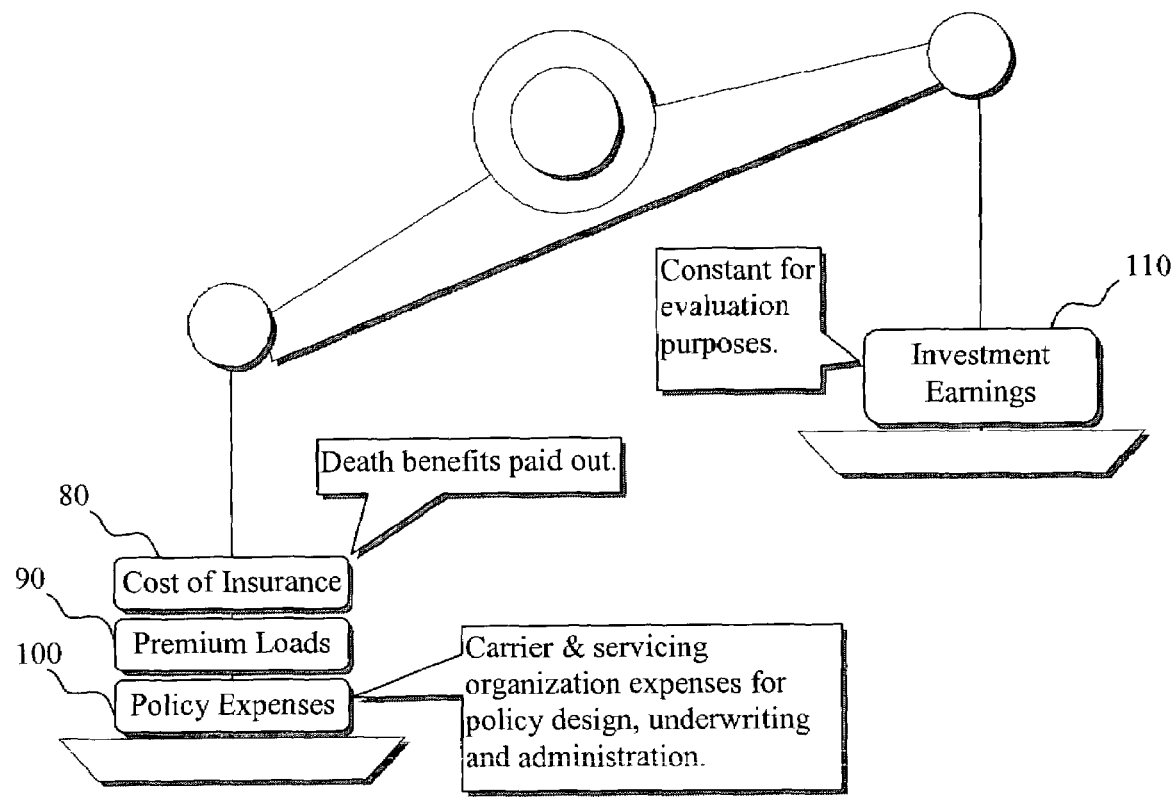
FIG. 2 is a diagrammatic view of the factors that influence the true value and efficiency of a permanent life insurance product.
Figure 3:
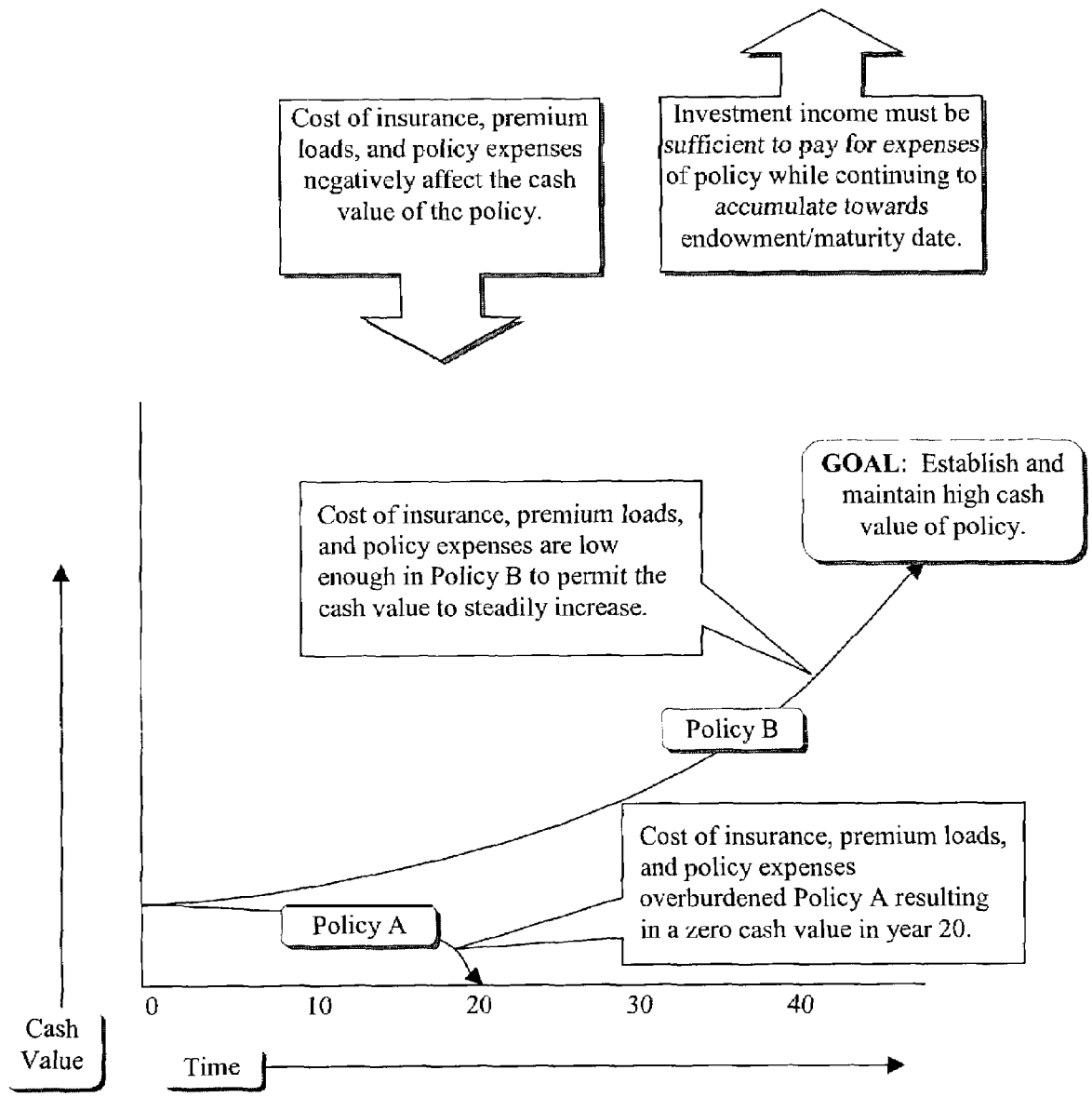
FIG. 3 is a diagrammatic view of an illustrative policy that erodes the cash value of a permanent insurance policy over time compared with a more efficient policy that permits the policy to accumulate cash value.

FIG. 2, represents the balance of costs of insurance 80, premium loads 90 and policy expenses 100 with respect to the investment earnings 110 of a policy. As illustrated in FIG. 3, good policies maintain cash value and continue to accumulate cash value. However, if the cost of insurance, premium loads and policy expenses overburden a policy, it may lose all cash value long before the endowment or maturity date of the policy. As an example, it can be seen that Policy A of FIG. 3 is inefficient and drops to a zero cash value in year 20. In contrast, Policy B's efficiency permits the cash value to accumulate. What is surprising to Advisors is that Policy A might be a "no load" policy while Policy B might incur relatively heavy loads. However, it is the combination of cost of insurance (death benefit claims), premium loads and policy expenses as a whole that determine the efficiency of a policy. Policy A may have paid out a high number of claim due to relatively risky or unhealthy policy holders. It might be just as likely that Policy A hid the "no-load" costs in its policy expenses. Either way, the novel invention solves the problem of resolving the efficiency of the policies which often have dramatic effects on the policy holder and his or her beneficiaries.

Figure 4:
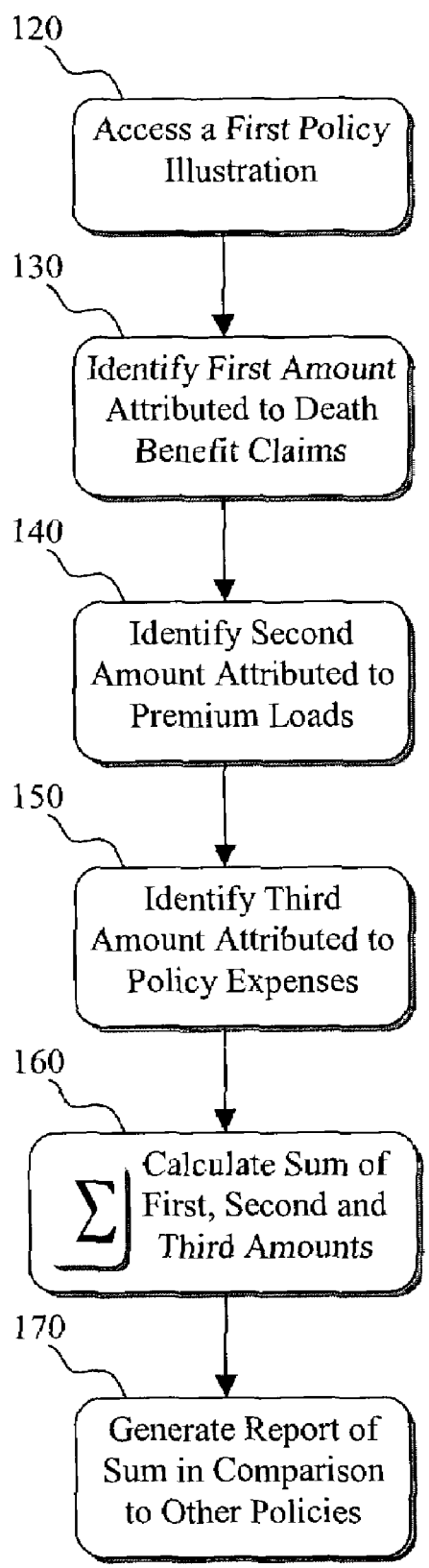
FIG. 4 is a diagrammatic view of the novel invention illustrating the steps to resolving the true cost of a permanent life insurance policy.

In FIG. 4, the fundamental steps to resolving the efficiency of a permanent life insurance policy are shown. A first policy illustration is accessed 120 and the first amount 130 attributed to death benefit claims is identified 130. The first amount 130 is also known as the COI. Next, a second amount 130 is identified which is attributed to premium loads. The next step includes identifying a third amount 150 attributed to policy expenses. The sum 160 of the first 130, second 140 and third 150 amounts is calculated to generate a report 170 to compare the first policy illustration with comparable policies.

Figure 5:
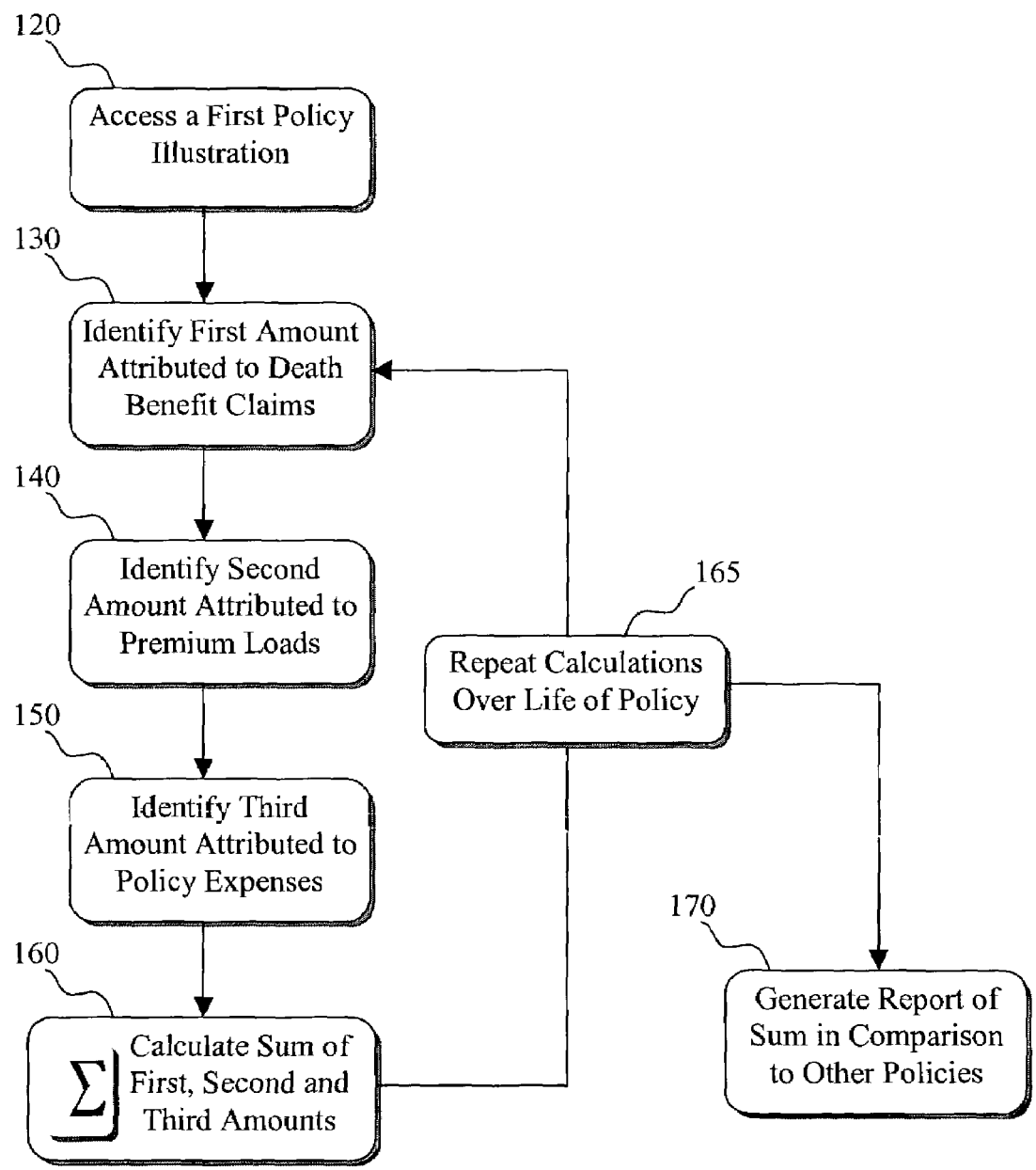
FIG. 5 is a diagrammatic view of the novel invention further illustrating the calculations repeated over the life a policy.
Figure 6:
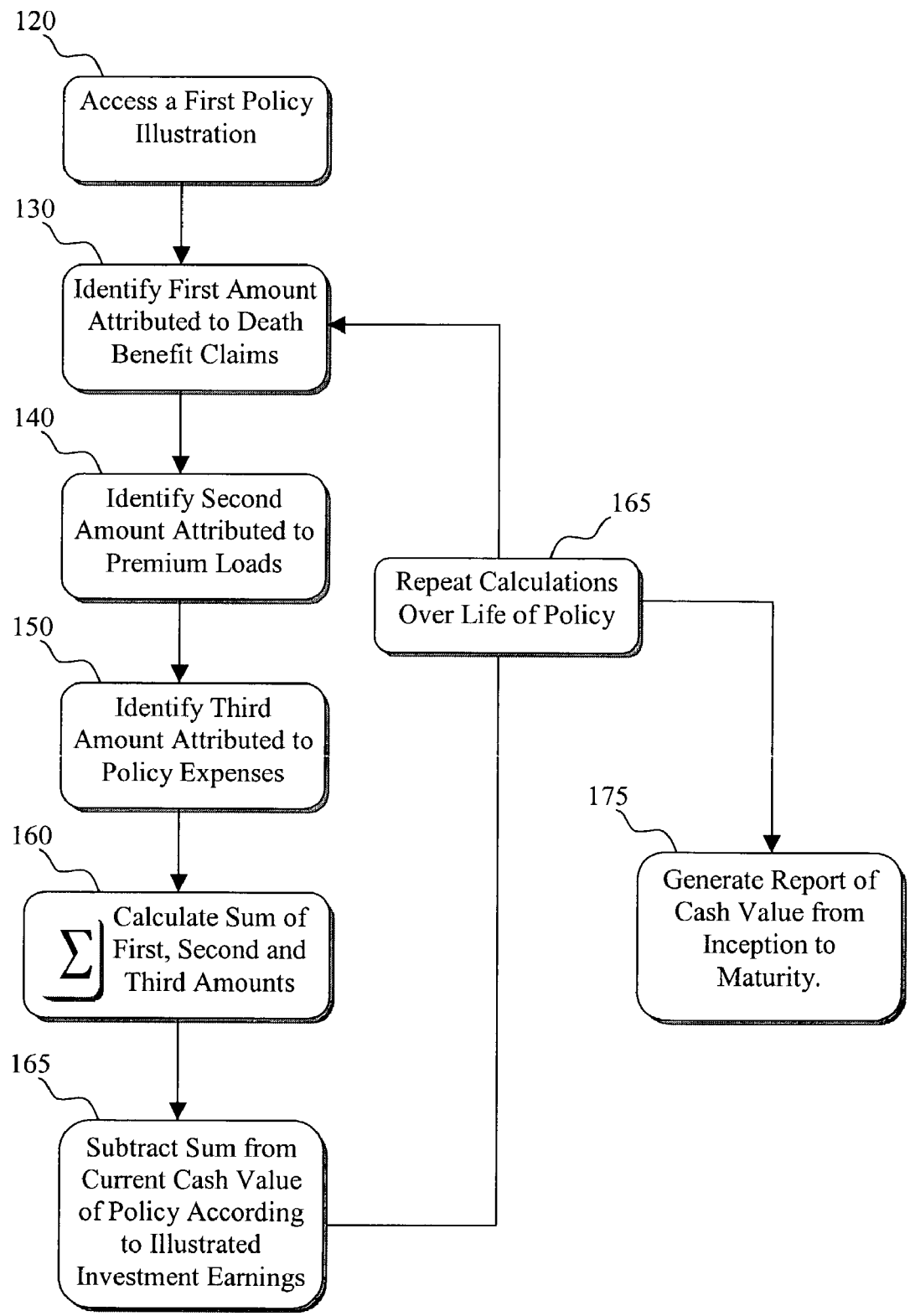
FIG. 6 is a diagrammatic view of the novel invention further calculating illustrated investment income earnings on the cash value of the policy.
Figure 7:
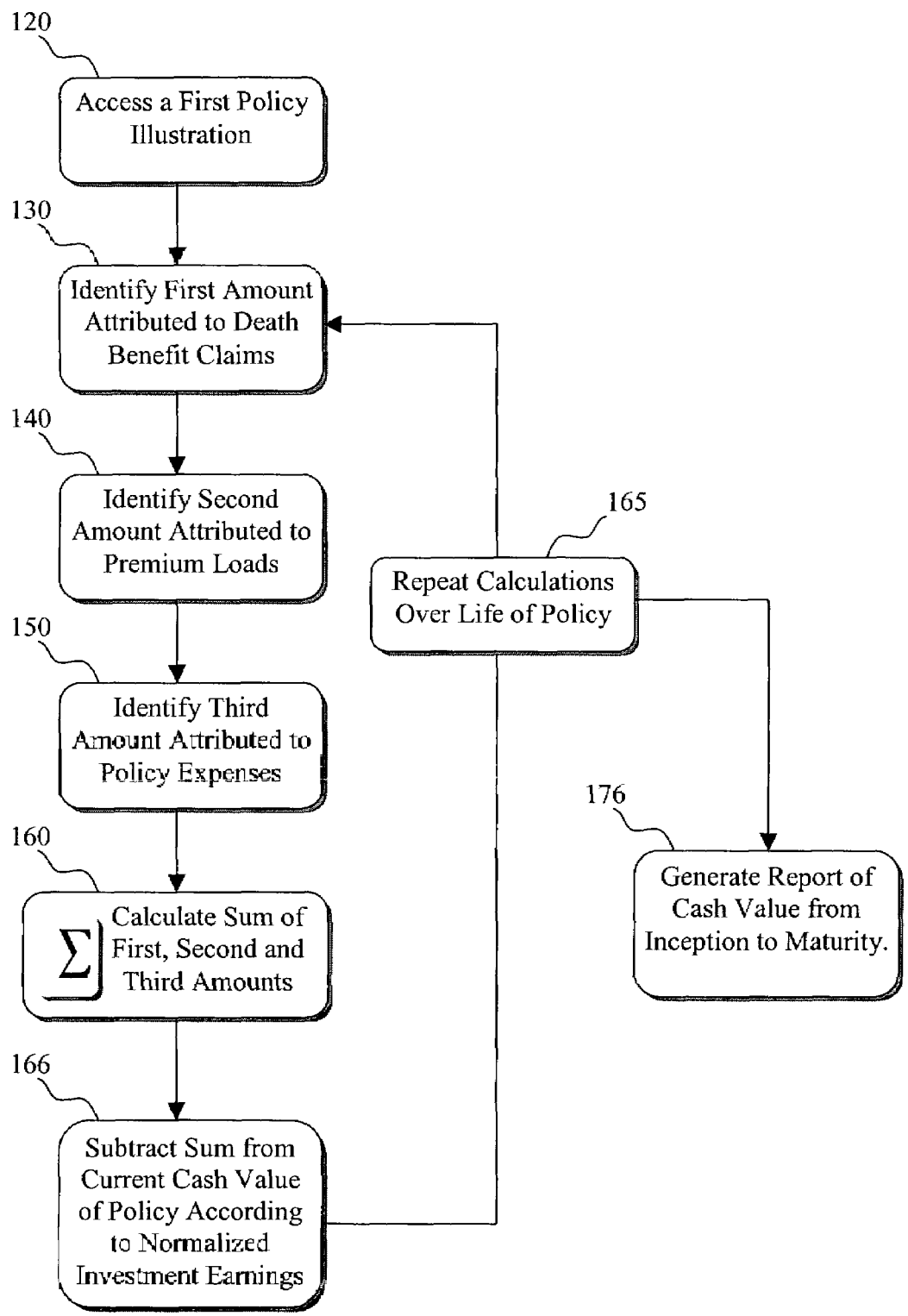
FIG. 7 is a diagrammatic view of the novel invention wherein the illustrated investment income earnings are normalized.

As shown in FIG. 5, it is preferred that the above-mentioned calculation be repeated 165 over the life of the policy. This might be necessary in some instances wherein certain initial or ongoing expenses vary between a plurality of policies being compared. In FIG. 6, an addition step of subtracting 162 the illustrated investment earnings from the sum 160 from the current cash value of the policy yields a report of the cash value from inception to maturity 175. However, as insurance companies do not have the clairvoyance to predict the future return on markets, FIG. 7 illustrates the additional step of normalizing 166 the illustrated investment earnings to yield a cash value report 176.

Figure 8:
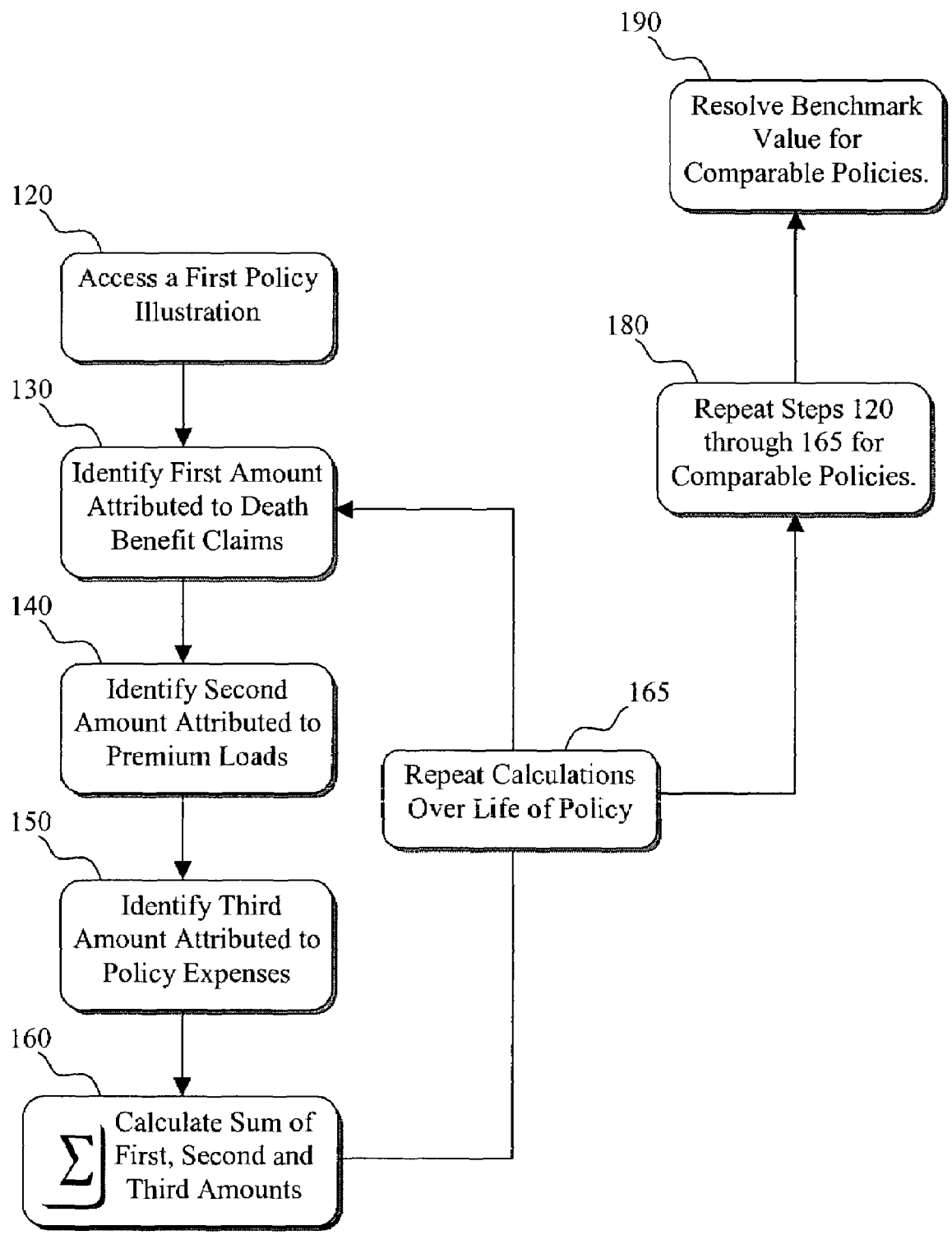
FIG. 8 is a diagrammatic view of the novel invention wherein a benchmark value is resolved for multiple policies.
Figure 11:
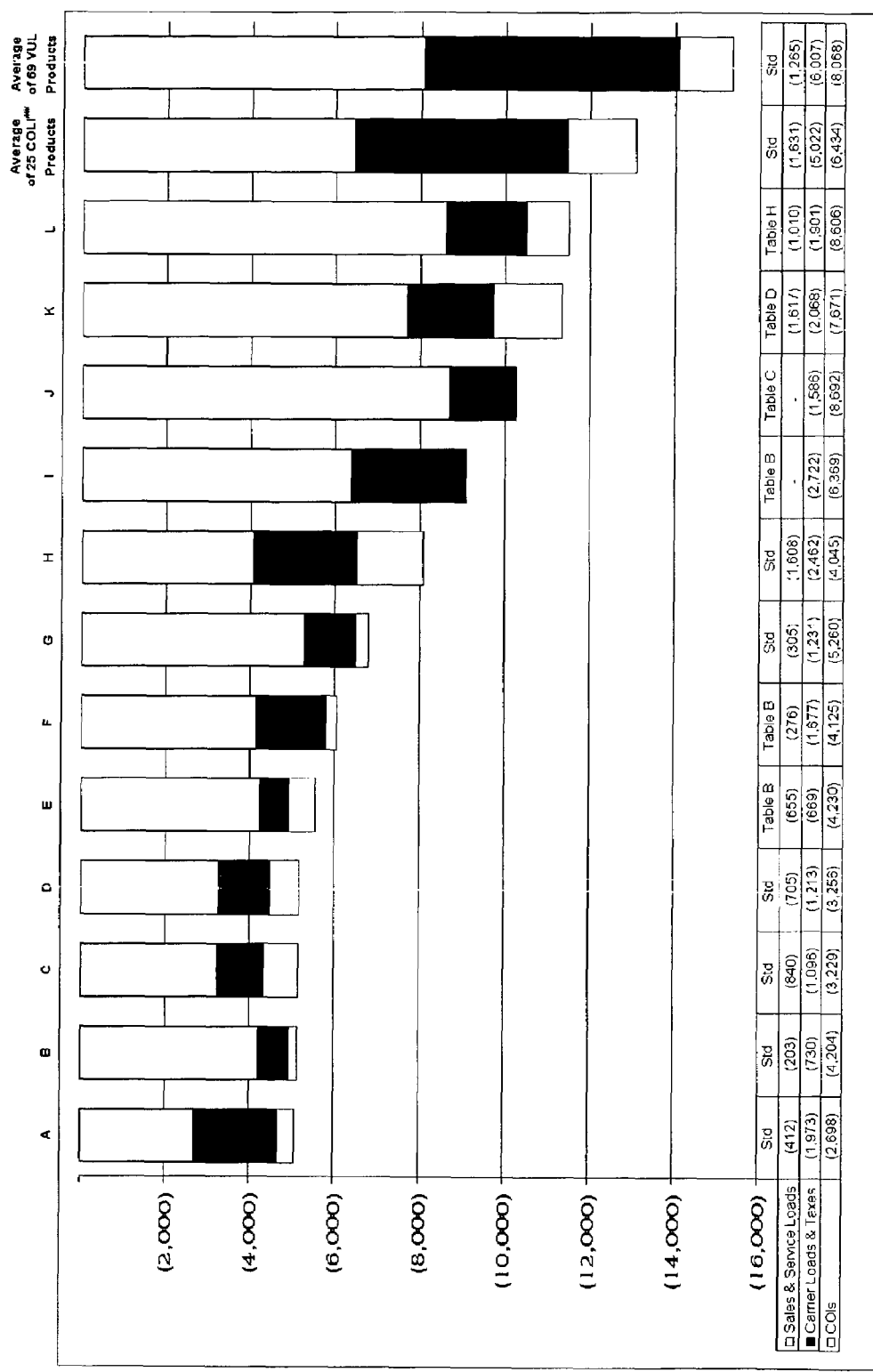
FIG. 11 is a graph illustration of a plurality of insurance policies compared by the total cost of insurance and further detailed by sales & service loads, carrier loads & taxes, and cost of insurance charges sorted from left to right, most efficient to least efficient respectively.

FIG. 8, shows the step 180 of repeating steps 120 through 165 for comparable polices to resolve a benchmark value 190 for comparable insurance policies which is illustrated in FIG. 11.

Figure 9:
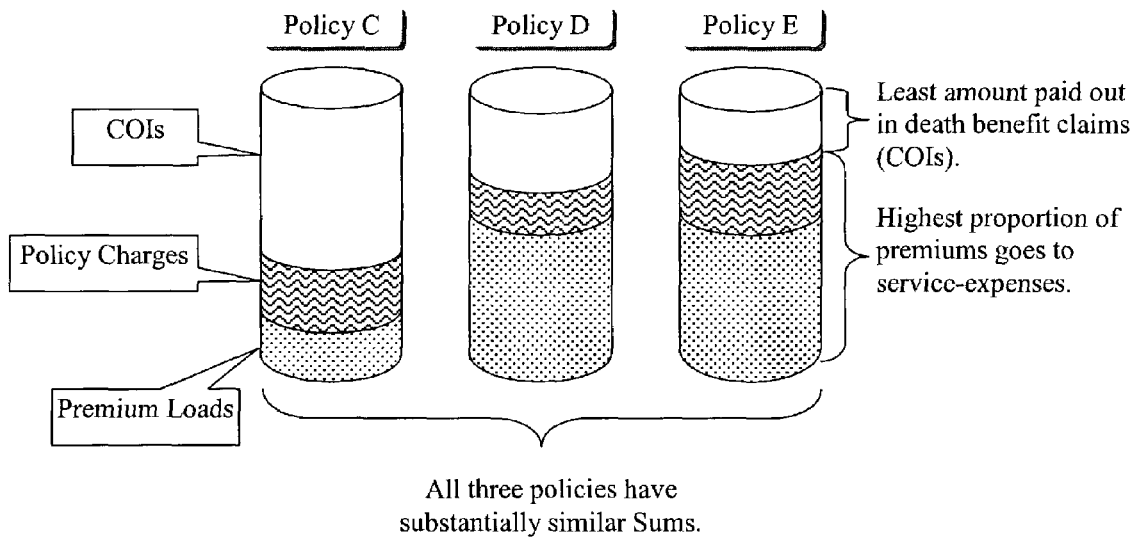
FIG. 9 is a graph illustration showing the relative proportion of insurance premiums in three sample policies attributed to cost of insurance charges, policy charges and premium loads.
Figure 10:
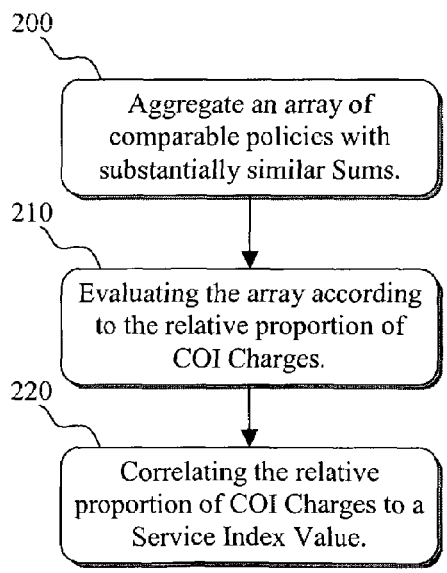
FIG. 10 is a diagrammatic view of the novel invention wherein a service index value is calculated to identify policies with the highest proportion of costs attributed to service.

FIG. 9 illustrates how three policies C, D and E may be compared even if their sums 160 are equal. It is evident that Policy C has a relatively high proportion of COIs to policy charges and premium loads in comparison to Policy E. It may be assumed that for the same amount of coverage, Policy C must spend more of its available funds to pay out death benefit claims, thereby leaving less money for policy administration and service. If all other variables are equal, Policy E might be preferred as there would be an expectation of superior service and policy administration. Accordingly, FIG. 10 illustrates the steps of aggregating an array of comparable policies with substantially similar sums 200, evaluating the array 200 according to the relative proportion of COI charges 210, and correlating the relative proportion of COI charges to a service index value 220.

To use the preferred embodiment of the novel invention to prepare an analysis, the consumer/Advisor need only ascertain a dozen and a half (18 pieces) of policy information that can be grouped into 2 basic types of policy information: 1) 14 pieces of policy information specific to/unique to the insured or the plan design prescribed by the insured or their advisor (hereafter Insured-Specific Data), and 2) 4 pieces of policy information specific to/unique to the policy under consideration/evaluation (hereafter Product-Specific Data), as follows:

Insured-Specific Data Collection:

(1) Age or Date of Birth of the proposed insured (some insurers or mortality tables calculate the age of the insured as the actual age of the insured for policy pricing purposes, while others price their policies on an "age-nearest" basis in which age is calculated as the insured age rounded up to the nearest whole integer—e.g. 49 years and 6 months old would be insurance age 50 for "age-nearest" policy pricing purposes). While the invention need not make any adjustments to the following calculations, if the invention given the date of birth of the insured/proposed insured, then the invention will need to ascertain whether COI rates correspond to "actual age" or "age nearest" rates for the given product under consideration or the mortality table used in the creation of the benchmarks;

(2) Gender (i.e. male, female, or unisex rates);

(3) Tobacco Use (i.e. non-smoker, never-smoker, smoker, tobacco user in some form other than cigarette smoking like smoking cigars or pipes, or like chewing tobacco, snuff, etc.);

(4) Health Profile (i.e. standard, preferred, super-preferred/preferred plus, or substandard rates usually expressed as a Table Rating [e.g. Table A, Table B, Table C, etc. or Table 1, Table 2 or Table 3, etc. with each Table letter or Table number corresponding to a 125%, 150% or 200% multiple of the standard rates/pricing), (5) Proposed Policy Face Amount (i.e. the initial policy death benefit)

(6) Death Benefit Option (e.g. either Death Benefit Option 1 or A in which death benefits remain level in an amount equal to the initial policy face amount over the life of the policy, Death Benefit Option 2 or B in which death benefits increase over time in an amount equal to the sum of the initial policy face amount plus the accumulated cash value over the life of the policy, or Death Benefit Option 3 or C which is some hybrid of Death Benefit Option 1/A and Death Benefit Option 2/B).

(7) Planned Duration of Insurance Protection (i.e. because many permanent life insurance policies actually permit the consumer, the Advisor or the Agent to determine the duration of coverage, this duration must be established as either the life of the proposed insured, or some specified point in time in order to ensure an apples-to-apples policy evaluation and comparison).

(8) Planned Premium Payment Amount (i.e. A dollar amount between the Minimum Premium require by the policy and the Maximum Premium permitted to be paid into the policy. While premium payments can vary from year to year, or even month to month, this Planned Annual Premium Payment Amount is typically a level amount planned to be paid for a planned number of years [see Planned Premium Payment Duration]. The Minimum Premium is an amount either determined by a contractual provision in policy itself, or equal to the amount necessary to maintain insurance coverage during the premium payment period [see Planned Premium Payment Frequency below]. The Maximum Premium is an amount either determined by a contractual provision in policy itself, or equal to the maximum amount permitted to be paid into the policy by law or regulation defining the Definition of Life Insurance {DOLI} or Modified Endowment Contracts {MEC}. Because many permanent life insurance policies actually permit the consumer, the Advisor or the Agent to determine the planned premium payment, the policy evaluation and comparison system must establish the amount the insured consumer intends to pay or the amount their Advisor or the Agent recommends to be paid.)

(9) Planned Premium Payment Duration (i.e. A period of time typically expressed as either a number of years [e.g. 10 years], as a number or annual or annualized premium payments [e.g. "a 10 pay"], as a particular age of the insured consumer [e.g. "pay to age 65"] or as the life of the insured [e.g. "Level Lifetime Pay"]. Again because many permanent life insurance policies actually permit the consumer, the Advisor or the Agent to determine the planned duration of the premium payment, the policy evaluation and comparison system must establish this duration over which the insured consumer intends to pay or over which their Advisor or the Agent recommends to be paid.)

(10) Planned Premium Payment Frequency (i.e. Annually, Semi-annually, Quarterly, or Monthly);

(11) Insurance Company Name (Optional, but if provided is used in labeling various results and data pieces in the Confidential Policy Evaluator (CPE) report, and to lookup carrier-specific information to be included in the Confidential Policy Evalutator (CPE) report, like Financial Strength and Claims-Paying Ability Ratings from the various Ratings Services [e.g. AM Best, Duff & Phelps, Standard & Poor's, Moody's, Weiss, etc.);

(12) Product Name (Optional, but if provided is used in labeling various results and data pieces in the Confidential Policy Evalutator (CPE) report, and to cross-check and verify policy pricing data supplied by the consumer insured or their Advisor against the TIA Product Database);

(13) Product Type and Suitability (i.e. Fixed-Rate Universal Life type products or Variable Universal Life type products. Because many permanent life insurance policies actually permit the consumer, the Advisor or the Agent to determine within prescribed ranges the assumed rate of return used to calculate premium sufficiency or compute the growth of cash value accumulations in a given period, [see Assumed Net Average Policy Earnings/Interest Crediting Rate below], and because policy costs over time are a function of both the timing of the various policy charges and expenses and this rate of return otherwise credited to cash accumulation values but for the deduction of those policy charges and expenses, an accurate policy comparison of projected policy costs must establish a projected/expected rate of return that is consistent with the policy owner's expectations as to the rate of return on policy cash accumulation values, their attitudes toward risk and reward, their level of financial sophistication, and their familiarity with investing in the various types of investments underlying the insurance product [a consumer with a conservative risk/return profile that directs assets into fixed-rate-type financial instruments with a 6% historical rate of return cannot expect more than a 6% rate of return in a life insurance policy whose cash values are allocated in a way that is consistent with that conservative risk/return profile, even though an Agent may be projecting a higher rate of return on the illustration of hypothetical policy values.);

(14) Assumed Net Average Policy Earnings/Interest Crediting Rate (i.e. the illustrated hypothetical rate of growth applied to policy cash account values after deduction from the Gross Policy Earnings/Interest Crediting Rate of Investment Management Fees, Fund Advisory Fees, Fund Operating Expenses, and other fund-level charges, but before deduction of Mortality & Expense Risk Charges (M&E) and other policy-level charges.).

Product-Specific Data Collection:

(15) COIs (i.e. either an estimate of COIs for each policy year expressed as a percent of a benchmark table, or the actual COIs for each individual policy year).

(16) Fixed Policy Expenses (i.e. either an estimate of the Fixed Policy Expenses for all policy years, or the actual Fixed Policy Expenses for each individual policy year, in either case expressed as either a fixed rate per unit of death benefit (typically per $1,000 of death benefit), or as a fixed rate per unit of time (typically per policy month), or the actual dollar amount that is the result of multiplying these fixed rates by either the unit of death benefit, or the unit of time, or both, that percent times the planned premium paid in each year).

(17) Premium-Based Expenses (i.e. either an estimate of the Premium-Based Expenses for each policy year, or the actual Premium-Based Expenses for each individual policy year, in either case expressed as either a percent of the premium paid each year, or the actual dollar amount that is the result of multiplying that percent times the planned premium paid in each year).

(18) Cash-Account-Value-Based Expenses (i.e. either an estimate of the Cash-Account-Value-Based Expenses for each policy year, or the actual Cash-Account-Value-Based Expenses for each individual policy year, in either case expressed as either a percent of the cash account value in each year, or the actual dollar amount that is the result of multiplying that percent times the cash account value in each year).

This information is readily available from either the hypothetical policy illustrations commonly provided to consumers and their Advisors when contemplating a purchase of insurance, or from the prospectus that must by law be provided to consumers or their Advisors when contemplating a purchase of a variable insurance product, or from both. With this information, the invention may be used to determine suitability for a given type of insurance buyer by evaluating and comparing the cost-competitiveness and pricing-adequacy of a given product being proposed. As such, the example evaluations below start with the same information that would be presented to a prospective insurance buyer or his Advisor, namely a hypothetical illustration of policy values.

Because variable universal life products are the fastest growing type of product, and because variable universal life products as a product class offer the greatest disclosure and publication of policy pricing date, the examples below use variable-universal-life-type (VUL) product to demonstrate the invention. However, the following examples are not intended to suggest that this evaluation methodology only works with VUL-type products as the invention can be used as a tool for determining suitability by evaluating and comparing the cost-competitiveness and pricing-adequacy of any product for which the above mentioned 18 pieces of data may be ascertained.

Illustrative Examples:

Each example below assumes the consumer or the Advisor is being presented a proposal for a VUL policy with a $250,000 face amount (roughly equal to the average $243,000+/– face amount policy purchased for the purposes of this example) insuring a male age 50 who does not use tobacco products and who is in "preferred" health. Each example further assumes there is a permanent need for insurance (i.e. premiums are to be calculated such that the duration of coverage provided under the policy is equal to the life of the insured, that this insurance need will remain level over time, and that the plan design prescribed calls for planned annual premium payments to be calculated such that premiums are projected to be suspended after 10 annual premium payments.

While the following examples use a representative individual life insurance product insuring a only single life, the following methods can also be employed to evaluate the cost-competitiveness and pricing-adequacy of both joint and last survivor products (i.e. Joint & Last Survivor Life Policies: Life insurance policy is designed to cover two lives. It pays a death benefit only when the second person dies. Because the policy is based on the mortality of both people the probability that all insureds will die in a given year, the premiums are usually lower than for two individual policies.), and joint first-to-die products (i.e. Joint First-to-Die Policies: Life insurance policy is designed to cover a plurality of lives. It pays a death benefit on the first death of any of the insureds. Because the policy is based on the probability that any one of a group of people will die in a given year, the premiums are usually higher than for two individual policies.). As such, differences in the computational methods corresponding to the different types of products that are distinguished by the number of lives insured under the policy, and the sequence of the deaths assumed under the policy.

In each example below, the invention is used to evaluate a given product using the following 3-step process:

(1) Establish benchmark(s) for the present value cost per $ of death benefit as a unit-of-measure for policy cost effectiveness and pricing adequacy, (2) Calculate the present value cost per $ of death benefit of all policy costs for the policy being evaluated, and (3) Compare the present value cost per $ of death benefit of all policy costs for the policy being evaluated to the benchmark cost per $ of death benefit to determine policy cost-effectiveness or pricing adequacy.

While the computational algorithms employed in establishing the both benchmark present value cost per $ of death benefit and the present value cost per $ of death benefit of the policy being evaluated could also be used to evaluate and compare the cost-effectiveness and pricing-adequacy of one policy directly to another, certain rules and restrictions governing the presentation of sales material can prohibit the comparison of one product directly to another. As such, individual policies are compared to the benchmark in order to comply with these rules and regulations. However, this methodology of comparing a given product to a benchmark is not intended to limit the use of the computational algorithms employed to only be used to compare a given product to the benchmark. Should these rules and regulations at some point be changed or relaxed to allow for the comparison and evaluation of one product directly to another, it is the intention of the invention to be used to compare and evaluate products directly to each other.

The first step in preparing a Confidential Policy Evaluation (CPE) is to establish the benchmark present value costs per $ of death benefit as a unit-of-measure against which a given policy may be evaluated and compared for cost-effectiveness and pricing adequacy. In the current environment, establishing this benchmark against which a given product under consideration can be compared is essential because insurance companies generally do not disclose and publish for public consumption the pricing information necessary to make an informed insurance buying decision. As such, the benchmark is established as a unit of measure against which all products can be evaluated for cost-competitiveness and pricing adequacy. This benchmarking methodology lends itself to the advisor community, who frequently use benchmarking methods in advising their clients, and who are the initial target audience of the invention. The practice of benchmarking is also a well-established practice and very common in financial services circles, where the performance of a financial instrument is frequently compared to an accepted benchmark that is in no way, shape or form tied to the financial instrument actually being measured.

For instance, prior to the compilation and publication by Morningstar, Inc. of mutual fund performance and pricing information, the evaluation and selection of a given fund was customarily based on a comparison to some index like the Dow Jones Industrials Average, the S&P 500, the NASDAQ, the Wilshire 5000, etc. However, over time, Morningstar build a database to include all relevant information for all mutual funds that was otherwise unavailable to the public at large, and in so doing, provided consumers with an independent and credible source of this information essential to make an informed investment decision. In addition, and more even importantly, by compiling this information in a centralized database, Morningstar was also able to provide consumers with a new, more relevant and precise benchmark that was actually based on average of all similar or comparable mutual funds products, and as such, was directly related to the fund under consideration. In other words, absent the information needed to create an average of all funds, funds were evaluated and selected based on how much they may have outperformed a given index verses how much another fund may have performed relative to that same index. While this is certainly an effective and credible means of comparing individual funds one to another, the creation of a benchmark based on the average of all similar funds is far more useful in that a given fund can be categorically ranked, evaluated and selected (e.g. a fund ranking in the top decile/top-10% of all funds) without the need to actually individually compare one fund to another.

Until such time as all relevant life insurance policy pricing information is compiled into a centralized database, and until such time as the data in this database can be used to calculate a benchmark actually based on average of all similar or comparable life insurance products, the only simple, understandable, and convenient means for comparing permanent life insurance products is through the creation of a benchmark against which individual policies can be measured for cost-competitiveness and pricing-adequacy. Calculating this benchmark present value cost per $ of death benefit in Step 1 from above can be reduced to a relatively simply process involving the following sub-steps:

Collect Insured-Specific Data—Ascertain the 14 pieces of Insured-Specific Data from the illustration of hypothetical policy values for the policy under evaluation such that the benchmark and the policy under evaluation are consistent as to the Age/Date of Birth, Gender, Tobacco Use, Health Profile, Policy Face Amount, Death Benefit Option, Planned Duration of Insurance Protection, Planned Premium Payment Amount, Planned Premium Payment Duration, Planned Premium Payment Frequency and Product Type, and Assumed Net Average Policy Earnings/Interest Crediting Rate.

The insured consumer or their Advisor collect this data directly from the illustration of hypothetical policy values for the policy under evaluation and inputs it into a series of data inputs. In a preferred embodiment, the data collection means includes a client-server architecture such as a web-browser and web-server arrangement. However, such data collection and presentation means are notoriously well-known in the telecommunications arts.

In addition, the insured consumer or their Advisor may optionally supply the name of the insurance company and the name of the product collect into a separate input screen, and input the Product Type, and Assumed Net Average Policy Earnings/Interest Crediting Rate information again taken from the illustration of hypothetical policy values for the policy under evaluation into a data input screen.

For the purposes of the example, it is assumed that the policy owner's expectations as to the rate of return on policy cash accumulation values, their attitudes toward risk and reward, their level of financial sophistication, and their familiarity with investing in the various types of investments underlying the insurance product have been established, and that it has already been determined that a variable universal life product is a suitable product. While the suitability of a given type of insurance product will have an impact on the rate of return that can reasonably be expected, and will therefore have an impact on the computation of costs over the life of any policy, the determination of suitability is deliberately outside the scope of this invention as suitability is generally determined by a Registered Investment Advisor (RIA), professional insurance agent or broker, or other financial services professional schooled in Modern Portfolio Theory.

Alternatively, Portfolio Allocation, Asset Allocation or Efficient Frontier software programs based on Modern Portfolio Theory can also be used to determine suitability. While these software programs do not actually recommend a particular product type, by applying accepted investment methodologies (e.g. Modern Portfolio Theory), including historical asset performance and attribution analysis, they can prescribe a suitable allocation of policy cash values based on the financial needs of the consumer, the time horizon or anticipated holding period for the policy, and the consumer's willingness to accept the risk of fluctuations in the value of the underlying cash values. In addition, by reference to historical returns for these assets that have been determined to be suitable, the software can also set expectations as to rates of return that could reasonably be produced by a policy whose cash values were allocated to those types of assets. Product suitability can then be determined by matching the recommended allocation of suitable assets and the corresponding returns against the asset classes typically underlying the different policy types and the corresponding historical returns of those policy cash values.

For instance, should the software determine that allocating some material portion of policy cash values into equity-type assets would be suitable, and that a suitable allocation of policy cash values should produce rates of return averaging 14% and ranging between −5% and +31%, then a fixed-rate-type Universal Life or Whole Life policy that is regulated to invest predominantly in bonds and mortgages, and which lay claim to historical long-term return averaging between 4% and 8%, would not be suitable for this consumer insured. Only a Variable Life type policy would be suitable in this situation because only variable-type policies may allocate a significant portion of policy cash values to equity-type assets, and only variable-type policies offer the flexibility to diversify policy cash values across a variety of assets classes sufficient to produce the types of returns corresponding to the recommended suitable portfolio. As such, the invention can use this information to assist the insured consumer or their Advisor with the determination of the Net Net Average Interest Crediting/Earnings Rate Assumption, but because these Asset Allocation software programs are readily available in the marketplace, this invention will not duplicate these efforts, but instead will incorporate either the use of one of these software programs or the results from one of these software programs into the invention.

The invention will, however, prescribe a range of permissible returns that may be used in the policy evaluation system for a given type of product based on both historical returns of the typical asset classes underlying the different policy types and on limits prescribed by the regulatory bodies charged with overseeing those different product types the life insurance or securities industry. The maximum return that may be used in comparing variable universal life policies is 12% based on a 10% historical average rate of return on equity-based assets approximating and as prescribed by Securities and Exchange Commission (SEC) rule. Conversely, the minimum return that may be used in comparing variable universal life policies is 0%, again as prescribed by SEC rule. Similarly, the maximum return that may be used in comparing fixed-rate universal life policies is 8% based on a 6% historical average rate of return on fixed-income-based assets plus 2%, and the minimum return is 4% based on the 6% historical average rate of return on fixed-income-based assets minus 2%.

Once this data is collected from the illustration of hypothetical policy values for the product under evaluation, the invention creates a table and stores these data input values into that table for future use as shown in FIG. 18.

Establish Benchmark Constants—Establish benchmark constants for each of the individual policy pricing components as to (A) COIs rates, (B) fixed policy expense factors, (C) premium-based expense loads, and (D) cash account value based expense percentages, as follows:

(A) Establishing Benchmark COI Rates—To establish Benchmark COI Rates, the invention begins with an accepted, industry-standard mortality table. The invention will then adjust this industry-standard table to create Benchmark COI rates that are consistent in nature (e.g. the same gender basis, the same tobacco use basis, and the same lifestyle/health profile basis) with those COI rates inherent to the policy under evaluation. While each insurance company has their own COI tables that are based at least in part on their own mortality experience (i.e. death claims experience), this underlying mortality experience is statistically similar for all insurers underwriting risks in the same market. For example, to illustrate the statistical similarity of mortality experience of different insurers operating in the same market, consider a hypothetical market in which there are only two insurers that underwrite all risks, that the market is large enough in size, as measured by the number or risks, to be statistically credible, that each insurer underwrites exactly half of all the risks in that market, and that each half is determined completely at random, statistically speaking. By definition, the mortality experience of both insurers will be statistically similar, if not actually identical As such, for this reason, the mortality experience of all insurers underwriting risks in a given market will be similar—both similar to the other insurers underwriting risks in that market, and by definition, similar to the accepted, industry-standard mortality tables applicable to that market. Given that the mortality experience of all insurers underwriting risks in a given market will be similar to the accepted, industry-standard mortality tables applicable to that market, these tables may be used as a benchmark for comparing each insurers' ability to screen and filter out poor/high risks through their underwriting process, and the corresponding cost-competitiveness and pricing-adequacy of the COIs for a given product.

There are a number of tables suitable to this purpose (e.g. the Society of Actuaries {SOA} 1980 Commissions Standard Ordinary Table {1980 CSO}, the Society of Actuaries {SOA} 1975-1980 Select & Ultimate Male/Female Mortality Table {75-80 S&U}, or the Society of Actuaries {SOA} 1990-1995 Select & Ultimate {90-95 S&U} Male/Female Mortality Table, etc.). The actual table used to establish benchmark COI constants can and will from geographic region to geographic region and vary from time to time as new and more updated tables become available. However, the particular table used in creating the benchmark at a given point in time is unimportant so long as the same table is used for all similar benchmarking evaluations and comparisons. For instance, by way of comparison, this is again similar to established benchmarking mythologies employed in the other sectors of the financial services industry. For instance, the performance of a given mutual fund is commonly compared to a variety of indexes, like the S&P 500, the underlying composition of which can and in fact does change from time to time.

As a result, while the invention is not predicated on the use of any given table of rates to create benchmark COI constants, in the example below, the Society of Actuaries (SOA) 1975-1980 Select & Ultimate (75-80 S&U) Gender-Distinct Mortality Table is used. Because these rates typically vary with the age of the prospective insured, benchmark COI constants must also be created for each age corresponding to each policy year over the anticipated duration of the policy. To create these COI constants for use in establishing the benchmark, the invention ascertains a rate per unit of death benefit for each policy year, and multiplies that rate by the Net At Risk Death Benefit. Depending upon the mortality table employed, these rates are typically expressed as either a rate per $1 of death benefit, or a rate per $1,000 of death benefit. In addition, again depending upon whether the mortality table employed is a "select and ultimate rate" table, or a "standard issue rate" table, these rates can differ for the same age depending upon the age of the policy as measured in policy years since the policy effective date (generally the date on which the policy was issued and became effective).

For instance, "standard issue rate" tables assume all individuals in a given risk category (e.g. female non-tobacco user) who are of the same age present the same probability for death claim in a given year, and as such will be assigned the same mortality rate, or cost of insurance rate. On the other hand, "select and ultimate rate" tables consider that, at the time of application for insurance, insurers are able to screen and filter out poor/high risks through their underwriting process, and in so doing, "select" the preferable or low risks. In this case, the probability of a death claim is less for an individual who successfully emerges from the underwriting process and who qualifies for insurance than it is for an individual of the same age, but about whom little or nothing is known with regard to their health profile, medical conditions, or lifestyle. As such, because the probability of a death claim is lower for someone recently underwritten, the underlying mortality rates and the cost of insurance rates based thereon will be initially lower, and remain so for some period of time following the underwriting of the policy and the issuance of the policy. These lower rates are commonly referred to as "select rates", and the period of time during which these "select rates" apply is called the "select period", which typically consisting of the first 10, 15 or 25 years of a given policy. With the passage of each year following the issuance of the policy, the information gathered during the underwriting process becomes less and less relevant to the probability of a death claim for a given insured. As such, the "ultimate rates" applicable following this "select period" are arrived upon in much the same way as that for "standard issue rates" in that they do not consider underwriting information for a given insured and, as such, are the same for all individuals of the same age within the same risk class.

Therefore, to create these COI constants for use in establishing the benchmark using the 75-80 S&U Mortality Table, the invention ascertains an industry-standard rate per $1 of death benefit for each policy year both during the "select period", and then during the "ultimate period", as follows:

Because "select rates" are unique for each issue age and policy year and (e.g. the mortality rate for the 1st policy year of a policy issued to a 50 year old will be different from the mortality rate for the 5th policy year of a policy issued to a 45 year old year who is now age 50), "select rates" are ascertained during the "select period" by first looking up the issue age of the insured/proposed insured, and then looking up the rate corresponding to the age of the policy as measured in policy years. For instance, a simple 3-step process by which the invention ascertains a benchmark COI rate for the 8th year of a policy issued on the life of a 50 year old male using the table below for, as shown in FIG. 19.

"Ultimate Rates": Because "ultimate rates" are the same for all insureds of the same age, without regard to the issue age of the policy, nor the policy year, nor the underwriting status of the insured (e.g. the mortality rate for an 80 year old is the same whether the policy was originally issued to a 50 year old or a 45 year old), "ultimate rates" are ascertained by simply looking up the rate corresponding to the attained age of the insured/proposed insured, as shown in FIG. 20.

Once the invention ascertains the industry-standard mortality rate corresponding to the given year for which the COI constant is being calculated, this benchmark mortality rate is placed into a table created specifically for the evaluation of the policy under consideration (referred to in this invention as the "COI Analysis table"). This process is then repeated for all ages corresponding to all policy years comprising the entire duration of the policy between the insured's age at issuance of the policy and the maturity/endowment age of the policy (e.g. for a policy issued to a 50 year old with a maturity/endowment age 100, the invention places the industry-standard mortality rate corresponding to age 50 in row 1 of the table, followed by placing the industry-standard mortality rate corresponding to age 51 in row 2 of the table, and so on repeating this process a total or 50 times [maturity/endowment age 100–issue age 50=50 iterations for each policy year]) such that the invention will have created a column of industry-standard mortality rates specific to the policy under evaluation for each year of the policy as shown in Column (2) of the COI Analysis Table as shown in FIG. 12.

After the invention creates the column of industry-standard mortality rates that relate specifically to the given policy under evaluation, the invention adjusts these industry-standard mortality rates to create the relevant benchmark mortality rates then used in creating benchmark COI constants specifically for the given policy under evaluation.

As previously noted, there are a number of different mortality tables appropriate for creating benchmark cost of insurance constants. For instance, some tables are gender distinct (i.e. a table of rates corresponding to the mortality of a given person of a given age with different rates for males and females), other tables may consider tobacco use (i.e. a table of rates corresponding to the mortality of a given person of a given age with different rates for those who use tobacco products and those who do not), and others may consider health profiles and lifestyle factors (i.e. a table of rates corresponding to the mortality of a given person of a given age with different rates for those considered to be a standard risk versus those considered to have a preferred health/lifestyle profile). The appropriateness of a given table for use by the invention in creating benchmark COI rates is influenced by the prevalence of use of that table within the actuarial community and the size of the body of data on which the mortality rates in the table are based.

For instance, tables of rates that distinguish between male and female mortality are very common, widely accepted within the actuarial community, and are usually based on the largest body of data. On the other hand, differences in mortality experience corresponding to tobacco-use versus non-tobacco-use, or standard versus preferred health or lifestyle profiles are often the subject of relatively smaller studies, based on representative but smaller sample statistically-credible populations, and which may or may actually produce a complete table of mortality rates for each distinct age.

For the purpose of the below examples, the invention will use the 1975-1980 Select & Ultimate (75-80 S&U) Mortality Table published by the Society of Actuaries (SOA), as previously mentioned. Also as previously mentioned, the table actually used to create the benchmark is unimportant for the reasons outlined above so long as the table used is a table representative of the mortality claims experience corresponding with that of the policy under evaluation, and so long as the same table is used in creating the benchmark that is then used for all policy evolutions and comparisons within a prescribed period of time. The 75-80 S&U Table is just such a widely-accepted industry-standard table. Also, because the 75-80 S&U Table is gender-distinct, no adjustment need be made for the gender of the given insured/proposed insured in the policy under evaluation, and the already gender distinct rate is carried over into Column (3) of the COI Analysis Table as shown in FIG. 13.

If a particular industry standard table selected for use as the starting point in creating the Benchmark COIs does not include rates distinguished between the genders, then the invention would request an adjustment factor from a reliable actuarial data source, place this adjustment factor in the right-hand side of Column (3) of the COI Analysis Table, multiply the rate from the industry standard table in the corresponding year/age/row by this adjustment factor, and place the result in the left-hand side of Column (3) for continued use by the invention in creating Benchmark COI rates.

While the 75-80 S&U Table is gender distinct, the rates in the 75-80 S&U Table do not distinguish between tobacco use and non-tobacco use, and between standard and preferred health/lifestyle risks. As a result, the invention will adjust the industry-standard gender-distinct rates from the 75-80 S&U Table now in Column (3) of the COI Analysis Table to correspond to the tobacco use/non-tobacco use and health/lifestyle profile assumed in the policy under evaluation. In addition, the invention will also adjust this industry-standard rate for each of the various pricing methodologies, also discussed above. The invention derives these adjustment factors from a combination of published actuarial data and private actuarial research. For instance, the factor used in the example below to adjust the industry-standard rates for tobacco use is based on a Report of the Individual Life Insurance Experience Committee entitled "Mortality Under Standard Individually Underwritten Life Insurance Between 1991-92, 1992-93, 1993-94, and 1994-95 Anniversaries".

This study reports on the actual dollar amount of death claims for a sampling of insurance companies for a variety of different risk classes, and compares the mortality ratios of actual-to-expected death claims relative to the 1975-80 Basic Tables for Male and Female Lives for these different risk classes. The results in the study are based on a sample population comprised of all insureds underwritten by nineteen (19) of the largest insurance companies that underwrite risks in North America. These larger insurers underwrite a disproportionately large number of risks relative to the balance of the market (e.g. the top 100 largest insurers constitute approximately 98% of the entire life insurance market with the 19 largest insurers making up more than their proportionate 19% share of that market). Because the claims experience of these insurers represents one-fourth or more (25%+) of the aggregate claims experience for all life insurers in North America, the body of data is certainly statistically significant, and because these insurers generally underwrite risks that are geographically diversified, the sample population is actuarially credible. Thus, studies such as this can be a reliable gauge of claims experience and mortality rates for different risk classes or different pricing methodologies not otherwise available from formal mortality tables.

For instance, the death claims data for nonsmokers versus smokers is shown below in Table 18 taken from this Report of the Individual Life Insurance Experience Committee entitled "Mortality Under Standard Individually Underwritten Life Insurance Between 1991-92, 1992-93, 1993-94, and 1994-95 Anniversaries".

This table compares the mortality ratios of actual-to-expected death claims for nonsmokers versus smokers relative to the 1975-80 Basic Tables for Male and Female Lives in Column (4) and Column (7), respectively. As we have discussed previously, while it is unimportant as to which mortality table is used as the starting point for the creation of Benchmark COI Rates, it is important that the same table be used throughout the creation of the benchmark and throughout the evaluation or comparison of a given product. As such, because the invention uses the 75-80 S&U Table for the creation of Benchmark COI Rates, and because the above study also uses the 75-80 S&U Table as its baseline against which relative nonsmoker and smoker mortality experience is measured, then this study can be a suitable data source for creating the adjustment factor used by the invention in the creation of Benchmark COI Rates.

While this adjustment factor can vary to correspond to different variables such as gender or age, and while the actual basis of the adjustment factor can and will change from time to time, as new studies may be published or new data becomes available, for the purpose of these examples, the above table will serve as an example of the types of actuarial data sources that can be used by the invention. The invention looks up the appropriate adjustment factor corresponding to the particulars (e.g. age, gender, etc.) of the insured consumer shown in the illustration of hypothetical policy values for the product under evaluation. In the example, the invention first ascertains the nonsmoker/smoker status appropriate to the evaluation by referencing the data input table to find the relevant age and smoker status, will lookup the 62.6% adjustment factor corresponding to a 50 year old nonsmoker, and place that adjustment factor in the left-hand side of Column (4), and will calculate the nonsmoker-adjusted Benchmark COI Rate for each policy year placing the result in the right-hand side of Column (4) of the COI Analysis Table as shown in FIG. 14.

Alternatively, if in our example, the illustration of hypothetical policy values reflected smoker rates, then the invention would lookup the 153.4% adjustment factor corresponding to a 50 year old smoker, and place that adjustment factor in the left-hand side of Column (4), and will calculate the smoker-adjusted Benchmark COI Rate for each policy year placing that smoker result in the right-hand side of Column (4) of the COI Analysis Table.

After the adjustments have been made for smoker/nonsmoker, further adjustments can be in order for health and lifestyle factors. Health factors are recognized by insurance companies during the underwriting process by a system of point allocations for various factors of health,—i.e. height, weight, past medical history, current findings upon medical examination, etc. Points are assessed by comparison to "norms" for healthy risks of the same gender and age. All of the points for health factors are then aggregated and the total is assigned a "rating classification", (i.e. "preferred", "standard", "table A", "table B", etc. all the way up to "table P". These table ratings are then translated into multiples of "standard mortality", e.g. 100%, 150%, 200%, etc. Other factors to be taken into account in reaching the COI Benchmark relate to the "lifestyle" of the insured. These would include such factors as (1) occupation, (police, firefighters, mineworkers, medical personnel in contagious environments, crop dusting aviators, steelworkers, deep sea salvage or exploration, automobile racing, etc.); (2) avocations, (private flying,—particularly low-hour, non-instrument rated pilots, motorcycling, skydiving, deep sea diving, prolonged travel to or residence in "third world countries"); (3) personal habits, (other than tobacco use, discussed above), such as alcohol/drug abuse, immoral lifestyle issues which might entail greater than normal risks, etc.

As before, because the 75-80 S&U Table does not distinguish between standard and preferred health/lifestyle risks, the invention will continue to adjust the Benchmark COI Rates now in Column (4) of the COI Analysis Table to now correspond to the lifestyle/health profile-based risk class appropriate to the policy under consideration/evaluation. As was the case with previous adjustments, the invention would derive these adjustment factors from a combination of published actuarial data and private actuarial research. However, because insurers generally architect rate structures such that only 10% or less of their insureds are issued preferred rates, with an even smaller proportion qualifying for preferred-type rates, if available at all, only a small proportion of the aggregate insured population actually qualifies for and is issued better than standard rates. As such, while the invention is capable of adjustments for lifestyle and health profile factors, the example policy evaluation included herein will, therefore, be prepared using standard rates.

Because the 75-80 S&U Table is an aggregate table of mortality rates/death claims rates that does not distinguish between standard and preferred risks, it therefore includes both standard and preferred risks. As such, the mortality rates for the standard risks aggregated within the 75-80 S&U Table are actually higher than the rates shown in the 75-80 S&U Table, and conversely, the mortality rates for the preferred and preferred plus or super-preferred risks aggregated within the 75-80 S&U Table are actually lower than the rates shown in the 75-80 S&U Table. As such, using a derivation of the 75-80 S&U Table rates that is unadjusted for lifestyle/health profile factors will result in Benchmark COI Rates that are slightly understated for benchmark comparisons of standard rate policies (i.e. the standard rate policy will compare slightly more favorably to the benchmark unadjusted for lifestyle/health profile factors than it would to a benchmark that included an adjustment for lifestyle/health profile factors) and slightly overstated for benchmark comparisons of preferred rate policies (i.e. the preferred rate policy will compare slightly less favorably to the benchmark unadjusted for lifestyle/health profile factors than it would to a benchmark that included an adjustment for lifestyle/health profile factors).

However, this variation is relatively small due to the comparatively recent advent of preferred and preferred plus/super-preferred rates, and due to the fact that only small proportion the mortality aggregated within the in the 75-80 S&U Table is attributable to preferred plus/super-preferred claims experience, which is therefore diluted by the majority of the claims experience attributable to standard risks. For both these reasons, and to save the reader from laboring through another actuarial study only to demonstrate again the same process outlined above in the discussion of the tobacco use adjustment, the invention will simply carry over the Non-smoker Benchmark COI Rate from Column (4) of the COI Analysis Table in FIG. 14 by placing a 100% in the left-hand side of Column (5) in the COI Analysis Table, thereby carrying over the tobacco-use-adjusted Benchmark COI Rate for each policy year into the right-hand side of Column (5) of the COI Analysis Table as shown in FIG. 15.

Of course, as new studies may be published or new data becomes available concerning the relative differential in claims experience between standard and preferred-type risks, the invention is equipped to incorporate this new data, and would simply place the new lifestyle/health profile adjustment factor derived from this data in the left-hand side of Column (5) in the COI Analysis Table and calculate the lifestyle/health profile adjusted Benchmark COI Rates accordingly.

The foregoing adjustments lead to an individual overall rating classification and COI tables for the risks being underwritten, relative to "Industry Aggregate Pricing" (i.e. an actuarial term referring to the pricing corresponding to the claims experience for all insured risks in the entire market at a given time). The final adjustment necessary to create Benchmark COI Rates is to adjust the rates calculated thus far in Column (5) of the COI Analysis Table to now reflect each of the various pricing methodologies corresponding to the distribution method for the group of risks being considered, and defined herein by the invention as "Retail Pricing", "Institutional Pricing", and "Experience-Rated Pricing". This adjustment is different from the three (3) adjustments made leading up to this point in that these prior adjustments have been cumulative in nature (i.e. the gender adjustment, if any, is made to the Industry Standard Table rates with which we started, then the tobacco-use adjustment, if any, is made to the Gender Adjusted rates, and then the lifestyle/health profile adjustment, if any, is made to the Tobacco Use Adjusted rates). Conversely, while there are as many as 3 additional adjustments to Benchmark COI Rates below, these three adjustments will create 3 separate and distinct Benchmark COI Rate Tables; 1 each to correlate with each of the three (3) different Pricing Methodologies.

As defined above, "Retail Pricing" refers to those policies that are priced to either be available to the general consumer by virtue of no or low minimum insurance face amount or premium requirements or policies that have relatively high policy expenses when compared to either "Institutional Pricing" or "Experience-Rated Pricing". "Retail Pricing" is therefore analogous to, in actuarial terms, "Industry Aggregate Pricing" which reflects experience across all life insurance policies issued, and can be found to be between 71%-78% of the 75-80 S&U Table, based on various recent studies. Because "Industry Aggregate Pricing" is comprised of the death claims experience for all life insurance policies issued, it by definition includes the experience for all policies otherwise being referred to separately herein as "Retail", "Institutional" and "Experience-Rated". However, because the bulk of all policies issued are "Retail" in nature, only small proportion the experience intrinsic to "Industry Aggregate Pricing" is attributable to "Institutional" and "Experience-Rated" pricing. To compensate for this contribution of "Institutional" and "Experience-Rated" experience to "Industry Aggregate Pricing", albeit small and diluted, the adjustment factor for "Retail Pricing" will be taken from the upper end of the aforementioned range. As such, for the purposes of this example, the invention will use a "Retail Pricing" adjustment factor equal to 76%, will place that factor in the left-hand side of Column (6) in the COI Analysis Table shown in FIG. 16, and will calculate the "Retail" Benchmark COI Rates for each policy year in the right-hand side of Column (6) of the COI Analysis Table.

Also as discussed above, "Institutional Pricing" refers to those products that are priced to have lower policy expenses or lower surrender/cancellation charges when compared to "Retail Pricing", or which are only available certain qualifying buyers by virtue of either some minimum insurance face amount or minimum premium requirements, or by virtue of certain personal or corporate financial suitability requirements. The most prominent example of "Institutional Pricing" could be a type of insurance product referred to as COLI, or Corporate Owned Life insurance. While virtually every type of life insurance may be corporately owned, COLI refers to a particular type of life insurance sold in large groups of policies to a single buyer, and in so doing, a "group discount" might be applied. As such, the death claims experience for "Institutional Pricing" is, by definition, a subset to "Industry Aggregate Pricing". As a result, the invention will again identify a reliable source of actuarial data suitable to the purpose of benchmarking institutionally-priced products.

While this source of actuarial data is derived from a combination of published actuarial data and private actuarial research, and while source of this data can and will change from time to time, as new studies are published or new data becomes available, for the purposes of these examples, the invention will use a study of large face amount policies as the basis for the "Institutional Pricing" adjustment factor. This study is one of a number of breakout studies published by the Society of Actuaries that identifies separately the experience associated with policies with face amounts over $1 Million, which generally reflects the experience of a superior risk due to more thorough and complete underwriting being done due to the larger risk presented by a single insured, and suggests this experience to be between 63% and 65% of the 75-80 S&U Table. As such, for the purposes of this example, the invention will use an "Institutional Pricing" adjustment factor equal to 64%, will place that factor in the left-hand side of Column (7) in the COI Analysis Table in FIG. 17, and will calculate the "Retail" Benchmark COI Rates for each policy year in the right-hand side of Column (6) of the COI Analysis Table.

Lastly, "Experience-Rated Pricing" refers to those policies that generally have lower COI charges as compared to either "Retail Pricing or "Institutional Pricing" that is the result of segregating the claims experience for a particular and expectantly superior group of risks into a separate pool. To isolate this particular group of risks into a separate pool, "Experience-Rated" products also are typically only available through either proprietary distribution channels or to qualified buyers on private placement basis for those meeting either some minimum insurance face amount or minimum premium requirements, or by virtue of certain personal or corporate financial suitability requirements, or by virtue of some occupational or lifestyle suitability requirements. Of course, the COI Charges for a particular "Experience-Rated" product is largely if not entirely dependent upon the death claims experience of the risks in the segregated pool upon which those COIs are based. As such, because each segregated pool is, by definition, a subset of and smaller than the particular insurer's general pool, and since the segregated pool was separated for the specific purpose isolating the expectantly superior experience of that segregated pool, and because each segregated pool can and likely will realize different death claims experience, these segregated pools will not necessarily behave in a fashion that would lend itself to the creation of a benchmark that would be universally relevant as a measure of cost competitiveness and pricing adequacy for all "Experience-Rated" products.

As a result, while the inventor is aware of a limited supply of non-published actuarial data associated with the death claims experience of segregated risk pools, and while the inventor has compiled additional private actuarial research related to the pricing of proprietary and private placement products offering the promise of lower COIs based on the superior claims experience of these segregated pools, for the reasons stated above, this invention will refrain from creating a Benchmark COI Rates for "Experience-Rated" products. Instead, and because "Experience-Rated" products are relatively few in number when compared to "Retail" or "Institutional" products, the invention will simply compare a given "Experience-Rated" product to the "Institutional" and "Retail" benchmarks as the need arises. Comparing "Experience-Rated" products to "Institutional" and "Retail" benchmarks nonetheless achieves the purpose of the invention to assist consumers or their Advisors in determining the cost competitiveness and pricing adequacy of a particular insurance product under consideration/evaluation as it may relate to the bulk of the marketplace for all products. In addition, should "Experience-Rated" products become sufficiently common in the marketplace, then the invention is capable of adding an additional adjustment factor for "Experience-Rated" products in the same way as that described above for "Retail" and "Institutional" products.

The result of this process is a table of Benchmark COI Rates representative of both "Retail Pricing" and "Institutional Pricing" that are suitable for the measurement of the cost competitiveness and the pricing adequacy of virtually any unbundled life insurance product in the entire market. In addition, over time, the invention will actually evolve the precision of these benchmarks from being simply representative benchmarks based on industry pricing norms, into an actual average of all products of similar type and rate basis. This is accomplished through a data collection process by which actual COI rates for a given product under evaluation that are calculated as part of the evaluation process that is the subject of this invention are then stored in a central database. In similar form as to how the invention can update the COI rate tables used by the invention to create Benchmark COI Rates as new studies are published or new data becomes available, the invention can also update these COI rate tables based on the averaging of the COI rates collected in this database.

For instance, in our example, the "Retail" Benchmark COI rate for a 50-year-old male nonsmoker with a "standard" lifestyle/health profile is 0.00081 per dollar of death benefit, or 48% of the corresponding 0.00170 rate from the industry-standard 75-80 S&U Table. If, however, after compiling a statistically significant number COI rates for a 50-year-old male nonsmoker with a "standard" lifestyle/health profile, the average of these COI rates is actually 0.00100, or 59% of the corresponding rate from the industry-standard 75-80 S&U Table, then the invention will adjust the benchmark to more precisely reflect the actual products in the marketplace against which the benchmark is being used.

This evolution is similar to that from the mutual fund industry in which, prior to the introduction of Morningstar and other similar publications, mutual funds were customarily evaluated against some relevant and representative benchmark like Dow Jones Industrials Average, the S&P 500, the NASDAQ, the Wilshire 5000, etc. However, with the advent of Morningstar and other like publishers of mutual fund information, all relevant fund information was collected and compiled into a centralized database, from which an average of this fund performance and expense information could be calculated. Only through the creation of this centralized database containing all relevant fund information could a consumer or Advisor evaluate a given mutual fund against both some relevant and representative benchmark, and against and ranked among all other funds. As a result, this invention will adopt these lessons learned from the mutual fund industry and take this same approach by initially creating a relevant and representative benchmark that may used to evaluate the cost competitiveness and pricing adequacy of a life insurance policy, and by ultimately creating a database of all life insurance policies against with a particular life insurance policy can be compared and ranked (e.g. policies will eventually be ranked in the top decile/top-10% of all policies, or the top decile 2 deciles/top-20% of all policies, etc) without the need to actually individually compare one policy to another, to another, to another, etc.

Establish Benchmark Constants (continued)—After having established Benchmark COI Rates above, the invention needs established benchmark constants for each of the remaining types of expenses or charges, loads or expenses inherent to all life insurance policies to cover the costs associated with:

Product development,
Filing the product for approval with the State Department of Insurance,
State Department of Insurance monitoring, oversight and maintenance of State Guarantee Association funds,
Certain policy-specific State and Federal Income Taxes,
Marketing the product to Agents,
Designing/tailoring the policy to fit the needs of the prospective buyer,
Distribution of the policy (i.e. commissions paid on the sale of the policy because in the current market policies are generally not purchased by the consumer of their own volition, but must still be sold),
Underwriting costs involved with application processing, medical examinations, health profile and lifestyle research, establishment of policy records, and other medically and financially underwriting expenses,
Issuing and delivering the policy,
Ongoing policyowner service and policy administration such as premium billing and collections, claims processing, record keeping, reporting and communication with policyowners, policy transactions like loans, withdrawals, surrenders, etc.,
Other expense and general operating overhead.

While different insurance companies use different naming conventions for what can appear to be many different types of charges associated with a given policy, the above various policy expenses are customarily disclosed as State Premium Taxes, Federal Deferred Acquisition Cost (DAC) Taxes, Sales Loads/Expenses, Underwriting Charges/Expenses, Policy Issue Charges/Expenses, Policy Administration Charges/Expenses, Administration Expense Charges/Fees, Policy/Contract Maintenance Charges/Expenses, Policy Service Fees/Expenses, Mortality and Expense Risk Charges (variable products only), Investment Management Fees, Investment Advisory Fees, Fund Operating Expenses, and Other Carrier Loads/Charges/Fees. However, despite this confusing variety of terms, all policy expenses can be grouped/categorized by the nature of the expense itself into 3 basic types: Fixed-Type Charges, Premium-Based Charges, and Cash-Value-Based Charges.

To establish these benchmark expense factors, the invention will use a number of sources of published product pricing data and private research to estimate an average for each of these expense categories. The sources of this data include, but may not be limited to, product guides published by the various insurance companies underwriting the various products, policy Prospectuses for products registered with the Securities and Exchange Commission (SEC), Private Placement Product Offering Memorandums for products not registered with the SEC but for which disclosure of policy pricing, fees and charges is required by the SEC, the footnote and endnotes pages of the actual product illustration of hypothetical policy values in which policy pricing factors, fees and charges are also typically disclosed, various reports and studies prepared and published by the Society of Actuaries or other reliable actuarial sources, various periodicals published for insurance industry or the financial markets which occasionally report on the pricing and features of the various insurance policies found in the various markets, and private market research either prepared by the inventor, or to which the inventor was privy.

In addition to the existing abovementioned data sources, the invention also collects this type of Product-Specific Data provided by the consumer insured or their Advisor for the given product under evaluation during the data input process described in the Data Collection & Input section above. Once collected through the data collection process, the invention compiles this data into a centralized database. Over time, with the data amassed in the centralized database, the precision of these benchmarks evolves from simply representative benchmarks based on industry pricing norms, into an actual average of all products of similar type and rate basis. In similar form as to how the invention updates the COI rate tables used by the invention to create Benchmark COI Rates as new studies are published or new data becomes available, the invention also updates these other benchmark expense factors based on the averaging of actual expense factors collected in this database.

As a result, through the creation of a relevant and representative benchmark that may used to evaluate the cost competitiveness and pricing adequacy of a life insurance policy, insured consumers and Advisors are motivated to provide policy pricing information en mass that would otherwise be unavailable. Through the compilation of this data into a centralized database of all life insurance policies, a given policy may actually be measured against the original benchmark, and ultimately may be compared against and ranked among all other life insurance policies (e.g. policies will eventually be ranked in the top decile/top-10% of all policies, or the top decile 2 deciles/top-20% of all policies, etc) without the need to actually individually compare one policy to another, to another, to another, etc. Therefore, to continue with the creation of the initial benchmark values, the invention will establish benchmark constants for each of the remaining 3 types of policy expenses.

Establishing Benchmark Fixed Policy Expense Factors: To establish Benchmark Fixed Policy Expense Factors, the invention uses a number of sources of published product pricing data and private research to estimate an average fixed policy expense factors for each pricing methodology. Fixed policy expenses take the form of either a flat charge that is periodically deducted from premiums or policy cash accumulation values (e.g. $10.00 each month or $120 each year), or a flat charge that is calculated in relation to the originally issued policy face amount (e.g. $1.00 per $1,000 of policy face amount). While this charge is fixed in amount at the time the policy is issued, it can vary by predetermined schedule depending on the year of the policy (e.g. $10.00 a month and $1.00 per $1,000 of policy face amount during the first 10 policy years, and $5.00 a month and $0.00 per $1,000 of policy face amount thereafter).

Fixed-Type charges also include contingent or back-end policy surrender charges that are deducted from the policy cash account value upon surrender or cancellation/termination of the policy. These surrender charges are calculated in relation to the initially issued policy face amount and can be as much as 100% of the Target Premium (defined above) for policies available to the general public at large (i.e. policies commonly referred to as "Retail Policies"), but can be less or even 0% for policies purchased in larger volumes (i.e. frequently referred to as "Institutionally-Priced" policies). In either case, this Surrender Charge typically remains level for an initial period of years (e.g. 5 years), then reduces to $0 over a following period of years (e.g. policy years 6-10 or 6 through 15).

Establishing Benchmark Premium-Based Expense Loads—To establish Benchmark Premium-Based Expense Factors, the invention uses a number of sources of published product pricing data and private research to estimate an average premium-based expense load factors for each pricing methodology. These premium-based expense loads typically include, but are not limited to, State Premium Taxes, Federal Deferred Acquisition Cost (DAC) Taxes, Sales or Servicing Loads, Other Carrier Loads, and any other policy expense that is calculated in a fashion in which the policy premium is a variable that determines the expense/load. Premium-Based Charges are charged to policyholders as a percent of the premium paid in a given year and typically ranges between 0% and 35%. Premium-based charges customarily cover State Premium Taxes that average 2.50%, Federal Deferred Acquisition Cost (DAC) Taxes averaging 1.5%, and Sales Loads/Expenses ranging between 0% and 30%. In addition, while State Premium Taxes and Federal Deferred Acquisition Cost (DAC) Taxes are generally calculated by the respective government agencies as a percent of premium, and while insurance companies must certainly pay these taxes, insurance companies are not required to assess the charge as a percent of premium. As such, some insurance companies charge no (i.e. 0%) premium charges, and collect State and Federal Taxes from other charges within the policy (usually COIs).

Premium-based charges can also vary depending on either the policy year in which a premium is paid or the level of the premium paid into a given policy. For instance, a higher premium load may be assessed in the early policy years to recover up-front expenses related to underwriting, issue and distribution of a given policy. After these up-front expenses have been amortized (frequently over a period of ten {10} policy years), premium loads are then often reduced to cover the relatively lower policyowner service and policy administration expenses. In addition, a higher premium load may be charged on actual premiums paid up to a "Base Policy Premium" or "Target Premium" level, while a lower premium load may be charged on actual premiums paid in excess of this "Base Policy Premium" or "Target Premium" amount. This "Base Policy Premium" or "Target Premium" is generally the premium which, if paid every policy year, would endow or mature the policy for its originally issued face amount based on guaranteed policy pricing assumptions as to COI's, Expenses and Interest/Earnings. In other words, "Base Policy Premium" or "Target Premium" is calculated by actuaries of the insurance company such that if the insurance company charged the maximum allowable under the terms of the policy contract, and if the insured/policyowner paid the "Base Policy Premium" or "Target Premium" every year, then the policy would guarantee to pay a death benefit regardless of the age of death of the insured.

This "Base Policy Premium" or "Target Premium" is, therefore, analogous to the "insurance premium" (i.e. that premium typically paid to maintain the insurance). Premium amounts paid into the policy in excess of this "Base Policy Premium" or "Target Premium" can, therefore, be viewed as "excess premium" above and beyond that which required to support a given insurance death benefit. The reason a policyowner would decide to pay this "excess premium" could be to either create a cash value reserve which can be used to pay future premiums, COIs or policy expenses from within the policy effectively pre-paying future premium otherwise due from the policyowner, or to accumulate wealth in the form of policy cash values that benefit from preferred Federal Income Tax treatment or special protection from the claims of creditors under State Law. As such, premiums paid up to the "insurance premium" are subjected to "insurance loads" to cover policy expenses unique to the insurance component of the policy, while premiums paid in excess of the "insurance premium" are subjected to a lower level of loads on those monies contributed toward policy cash values.

Having derived the COI "unloaded premiums", one next considers "load benchmarks" to allow for various expenses which must be included in the final determination of premium amounts. Consider first "premium based load benchmarks", which are expressed as a (usually constant) percentage of premium. The first of these might be the premium tax, at, say 2.35% of premium. For each dollar of premium, there would therefor be an accompanying premium tax of $2.35.

In somewhat the same vein, but separately stated, would be the DAC, (Deferred Acquisition Charge) tax, at, say 1.5% of premium, adding another $1.50 to each dollar of premium.

Next would come the loads imposed by the carrier, and these would obviously vary from one insurer to another. The amounts used in the examples contained herein have been obtained from public domain and private research by the author, and would include various sales, service and administrative loads required by the carrier for the conduct of their enterprise.

Establishing Benchmark Cash-Account-Value-Based Expense Percentages—To establish Benchmark Cash-Account-Value-Based Expense Factors, the invention uses a number of sources of published product pricing data and private research to estimate an average premium-based expense load factors for each pricing methodology. These Cash-Value-Based Charges are charged to policyholders as a percent of either the policy Cash Account Values (i.e. the total cash value of a given policy) or the policy Cash Surrender Value (i.e. the cash value of the policy less any surrender charges or cancellation/termination fees that would apply on the surrender or cancellation/termination of the policy). All permanent life insurance products include a living benefit, in addition to the death benefit, in the form of this Cash Account Value or Cash Surrender Value. This account/surrender value is the surplus or excess premium paid into the policy above and beyond the various policy charges. These account/surrender values are invested into either the insurance company's general account of predominantly bonds and mortgages in the case of whole life and universal life products, or a variety of mutual-fund-like separate accounts selected by the policyowner in the case of variable life products.

Cash-value-based charges are most commonly calculated as a percent policy Cash Account Values, typically range between 0.00% and 4.00% in total, but are divided by their nature into two (2) different types of Cash-Value-based charges; 1) Fund-Level or Fund-Specific charges, and Policy-Level or Policy-Specific charges. Fund-Level or Fund-Specific charges relate specifically to the investment portfolio or separate accounts funds upon which the cash value is based. Examples of Fund-Level or Fund-Specific charges include, but are not limited to charges at the investment fund or portfolio level for investment management fees, investment advisory fees, or fund operating expenses, but these charges may or may not be disclosed depending upon the type of the policy (e.g. While Life and Universal Life policies do not customarily disclose Fund-Level or Fund-Specific charges while Variable products do publish these expenses. In addition, because Fund-Level or Fund-Specific charges are a function of the underlying investment portfolio or separate account funds, which may or may not be disclosed, and which can be, and usually is different for different policies of the same product line, then these Fund-Level or Fund-Specific charges are more of a investment expense than a policy expense, and therefore should only be considered when comparing investment or separate account fund selections, and not when comparing policy level costs.

On the other hand, Policy-Level or Policy-Specific charges relate specifically to the policy itself, without regard to underlying portfolio investments or separate account fund selections. The most common Policy-Level or Policy-Specific Cash-Value-based charge is the Mortality and Expense Risk Charge (M&E) intended to cover the risks assumed by the insurance company that actual cost of insurance charges will be greater than expected (i.e. insureds live less time than anticipated resulting in higher/earlier claims) or that actual expense charges will be greater than expected. Some products also include Policy-Level or Policy-Specific Cash-Value-based charge in addition to the M&E charge, both of which can vary depending on the year of the policy (e.g. 1.00% of cash values during the first 10 policy years, and 0.5% of cash values thereafter). Because these Policy-Level or Policy-Specific Cash-Value-based charges are specific to the policy, without regard to the underlying investment portfolio or separate account fund selections, they are truly a policy cost to be considered when comparing one policy to another.

In addition to the "premium based load benchmark", there are also fixed type expenses which are not necessarily/customarily a function of the amount of the premium. These would include flat per month charges, charges per unit of death benefit, and issue charges, (assessed overall to each policy issued).

Create a Benchmark Illustration of Hypothetical Policy Values—Using the benchmark constants, calculate for each year of the policy hypothetical benchmark values for each of the individual policy pricing components as to hypothetical benchmark COIs charges, hypothetical benchmark fixed policy expense charges, hypothetical benchmark premium-based expense charges, and hypothetical benchmark cash-account-value-based expense charges.

In all cases, COI charges are calculated each policy year as the result of the policy "net at risk" death benefit multiplied times a COI Rate provided by the insurance company for each age corresponding to each policy year for each product. This "net at risk" death benefit is that portion of the total death benefit in excess of any policy cash value. For example, one of the defining characteristics of permanent life insurance policies is that they have a cash value in addition to the death benefit. This cash value typically increases over time, while death benefits either remain level, in which case this "net at risk" death benefit changes from year to year, or while death benefits also increase over time, in which case this "net at risk" death benefit remains the same from year to year, depending upon the design of the policy. As such, while different policies can calculate the "net at risk" death benefit differently, this Net Amount at Risk can be generally represented as follows:

Net Amount at Risk$_{Yr}$=Total Death Benefit$_{Yr}$−Policy Cash Account Value$_{Yr}$ Where "Yr" indicates that the variable in the formula is calculated for each policy year.

For instance, it is common for permanent life insurance policies with a level death benefit to be priced such that policy cash values and policy death benefits become equal by design at the maturity or endowment age of the policy (defined by statute between age 95 and 100 depending on the policy). As such, as cash values increase and the death benefit remains level/the same, the "net at risk" death benefit (or Net Amount at Risk) declines.

On the other hand, permanent life insurance policies with an increasing death benefit are typically priced such that policy cash values become equal to the originally issued face amount, while the total death benefit is either equal to, or approximates this originally issued face amount, plus the accumulated cash account value at any given point in time. As cash values increase and in so doing push up the death benefit, the "net at risk" death benefit (or Net Amount at Risk) remains substantially the same.

As a result, the actual COI charge for a given policy will be a function of the COI rate provide by the insurance company for each year of a given policy, the Net Amount at Risk in each of those years of the given policy, and the design of the policy death benefit (i.e. level death benefit or increasing death benefit) for the given policy. While different policies can calculate COIs differently, these charges can be generally represented as follows:

COI Charge$_{Yr}$=COI Rate$_{Yr}$(provided by the insurance company and typically expressed per $1,000 of death benefit)×(Net Amount at Risk$_{Yr}$/1,000)

Where "Yr" indicates that the variable in the formula is calculated for each policy year.

Fixed-Type Charges are charged to policyholders as some fixed amount calculated at the time the policy is issued As such, while different policies can calculate Fixed-Type Charges differently, these charges can be generally represented as follows:

Fixed-Type Charges$_{Yr}$=Fixed Monthly Charge$_{Yr}$ * 12 Months+Fixed Per $1,000 Charge$_{Yr}$(if applicable) * (Death Benefit$_{Yr}$/1,000)

Where "Yr" indicates that the variable in the formula is calculated for each policy year.

Surrender Charges$_{Yr}$=Surrender Charge Per $1,000 Rate$_{Yr}$(if applicable) * (Death Benefit$_{Yr}$/1,000)

Where "Yr" indicates that the variable in the formula is calculated for each policy year.

While different policies can calculate premium loads differently, these charges can be generally represented as follows:

Premium Loads$_{Yr}$=[the lesser of Target Premium or Total Premium]$_{Yr}$ * Premium Load %$_{Yr}$+[the greater of (Total Premium−Target Premium) or 0]$_{Yr}$ * Premium Load %$_{Yr}$ Where "Yr" indicates that the variable in the formula is calculated for each policy year.

While different policies can calculate Policy-Level or Policy-Specific Cash-Value-based charges differently, these charges can be generally represented as follows:

Cash-Value-based charges$_{Yr}$=Cash Account/Surrender Value$_{Yr}$ * Cash-Value-based charge %$_{Yr}$ Where "Yr" indicates that the variable in the formula is calculated for each policy year.

Interest or Investment Growth (i %): As noted above, all permanent life insurance products include some form of cash value in addition to the death benefit. These cash values are credited with interest/earnings after COI charges and Expenses have been deducted. However, the interest/earnings rates that apply the different types of products are fundamentally different in the way they are calculated and disclosed. For instance, excess premiums and policy cash values of Whole Life and Universal Life policies are credited with a net portfolio interest rate roughly corresponding over time to the anticipated/projected net yield on the insurer's general account investment portfolio of predominantly high-grade government and corporate bonds and mortgages. In the case of Whole Life policies, there is no disclosure or publication of either this net interest crediting rate nor the expenses associated with the management and operation of this portfolio. In the case of Universal Life policies, the net interest crediting rate is declared and published from time to time by the insurance company, but there is still no disclosure of investment expenses, advisory fees, management fees nor portfolio operating expense, in much the same way that Certificates of Deposit (CDs) offered by banks simply publish a net interest rate.

On the other hand, like mutual funds, Variable Life policies are required to disclose investment expenses and management fees. However, these expenses related to the underlying investment of policy cash values have less to do with the cost-effectiveness of a given policy, and more to do with the selection of the underlying mutual-fund-like separate accounts that invest in individual stocks, bonds and other securities supporting policy cash values, which can and do change from time to time. Also like mutual funds, Variable Life policy cash values can, therefore, publish a historical earnings rate, but because this earnings rate is variable, by definition, fluctuating with the performance of the individual securities within mutual-fund-like separate accounts, it is simply not possible to prospectively declare a policy earnings rate. As a result, the illustration of hypothetical policy values and the computation of policy pricing for Variable products is typically based on actual historical rates of return. This is in contrast to Whole Life and Universal Life policies that routinely base hypothetical policy pricing projections on the currently declared net interest crediting rate instead of actual historical portfolio yields, which may be higher or lower than the assumed declared rate. In order to be able to compare different policies of the same type, or conceivably compare different policies of different types, this net interest/earnings rate must be based on use available data, and must be calculated on the same basis.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A computer program product that enables a computer to benchmark the pricing of a permanent life insurance policy comprising:

software instructions enabling the computer to perform predetermined operations; and a computer readable medium bearing the software instruction, the predetermined operations including:

accessing a policy illustration analyzing the future performance of the permanent life insurance policy, selecting a value point of the policy, identifying an array of aggregate expenses assessed by the insurance carrier to maintain the policy, wherein the array of aggregate expenses includes at least two selected from the group consisting of: costs illustrated by the insurance carrier to pay out death benefit claims, costs illustrated by the insurance carrier for policy charges less costs related to the payment of death claims exacted by the insurance carrier, costs illustrated by the insurance carrier for premium loads exacted by the insurance carrier as a percentage of premiums paid, costs illustrated by the insurance carrier for taxes paid to at least one governmental agency by the insurance carrier, costs illustrated by the insurance carrier for cash-value-based expenses exacted by the insurance carrier as a percentage of policy cash values, and costs illustrated by the insurance carrier for fixed expenses exacted by the insurance carrier in an amount calculated at the inception of the policy, calculating a sum of the array, establishing a benchmark value for the policy illustration based on industry published data, and comparing the sum relative to the value point with the benchmark value, whereby the cost competitiveness and pricing adequacy of the policy illustrations' representation are determined, wherein the computer benchmarks the pricing of a permanent life insurance policy.

2. The computer program product of claim 1, further comprising:

said value point selected from the group consisting of a face amount value of the policy, a cash value of the policy, and a fixed value of the policy by policy year.

3. The computer program product of claim 1, further comprising: said benchmark value including an expected mortality rate for the policy illustration based on industry published data.

4. The computer program product of claim 1, further comprising: said benchmark value including an expected policy expense charge value for the policy illustration based on industry published data.

5. The computer program product of claim 1, further comprising: said benchmark value including an expected premium load for the policy illustration based on industry published data.

6. The computer program product of claim 1, further comprising: said benchmark value including an expected tax for the policy illustration based on industry published data.

7. The computer program product of claim 1, further comprising: said benchmark value including an expected cash-value-based expense value for the policy illustration based on industry published data.

8. The computer program product of claim 1, further comprising: said benchmark value including an expected fixed expense value for the policy illustration based on industry published data.

9. The computer program product of claim 1, said predetermined operations further comprising:

normalizing the array of aggregate expenses in terms of present value.

10. The computer program product of claim 1, said predetermined operations further comprising:

comparing the array of expected aggregate expenses to the array of policy expenses assessed each year by the insurance carrier to maintain the policy.

11. The computer program product of claim 1, said predetermined operations further comprising:

comparing the timing and weighting of the array of expected aggregate expenses to the timing and weighting of the array of policy expenses assessed by the insurance carrier to maintain the policy.

12. A computer system adapted to benchmark the pricing of a permanent life insurance policy, comprising:

a processor, and a memory including software instructions that cause the computer system to:

access a policy illustration analyzing the future performance of the permanent life insurance policy, select a value point of the policy, identify an array of aggregate expenses assessed by the insurance carrier to maintain the policy, wherein the array of aggregate expenses includes at least two selected from the group consisting of: costs illustrated by the insurance carrier to pay out death benefit claims, costs illustrated by the insurance carrier for policy charges less costs related to the payment of death claims exacted by the insurance carrier, costs illustrated by the insurance carrier for premium loads exacted by the insurance carrier as a percentage of premiums paid, costs illustrated by the insurance carrier for taxes paid to at least one governmental agency by the insurance carrier, costs illustrated by the insurance carrier for cash-value-based expenses exacted by the insurance carrier as a percentage of policy cash values, and costs illustrated by the insurance carrier for fixed expenses exacted by the insurance carrier in an amount calculated at the inception of the policy, calculate a sum of the array, establish a benchmark value for the policy illustration based on industry published data, and compare the sum relative to the value point with the benchmark value whereby the cost competitiveness and pricing adequacy of the policy illustrations' representation are determined, wherein the computer benchmarks the pricing of a permanent life insurance policy.

13. The computer system of claim 12, further comprising:

said value point selected from the group consisting of a face amount value of the policy, a cash value of the policy, and a fixed value of the policy by policy year.

14. The computer system of claim 12, further comprising:

said memory further including software instructions that cause the computer system to compare the array of expected aggregate expenses to the array of policy expenses assessed each year by the insurance carrier to maintain the policy.

* * * * *